United States Patent [19]

Kouchi et al.

[11] Patent Number: 5,406,475
[45] Date of Patent: Apr. 11, 1995

[54] DATA PROCESSING NETWORK HAVING A PLURALITY OF INDEPENDENT SUBSCRIBERS

[75] Inventors: Toshihito Kouchi; Hitoshi Kawada; Yoshiki Ogawa, all of Tokyo, Japan

[73] Assignee: Olympus Optical Co., Ltd., Tokyo, Japan

[21] Appl. No.: 56,057

[22] Filed: Apr. 30, 1993

[30] Foreign Application Priority Data

Apr. 30, 1992 [JP] Japan .................. 4-111223

[51] Int. Cl.⁶ ........................... G06F 15/24
[52] U.S. Cl. ..................... 364/401; 364/403
[58] Field of Search ............. 364/401, 402, 403, 408, 364/468

[56] References Cited

U.S. PATENT DOCUMENTS

| | | | |
|---|---|---|---|
| 4,851,999 | 7/1989 | Moriyama | 364/401 |
| 5,204,821 | 4/1993 | Inui et al. | 364/403 |
| 5,231,567 | 7/1993 | Matoba et al. | 364/408 |
| 5,237,495 | 8/1993 | Morii | 364/403 |
| 5,299,115 | 3/1994 | Fields et al. | 364/401 |
| 5,303,147 | 4/1994 | Oba et al. | 364/402 |
| 5,311,438 | 5/1994 | Sellers et al. | 364/401 |

FOREIGN PATENT DOCUMENTS 4-108133  4/1992  Japan .

Primary Examiner—Robert A. Weinhardt
Attorney, Agent, or Firm—Frishauf, Holtz, Goodman & Woodward

[57] ABSTRACT

A data service company comprises an integrated database (DB) in which various business data dispersively kept in each part in an apparel industry including plan, manufacture, and sales relating to a dress as a product and textile raw material as material is integrated and a host computer (integrated database management system) including a computer hardware and a software for retrieving data from the integrated DB in accordance with data service to be provided and for outputting data. There is formed a data service network in which the integrated DB of the data service company is provided as the nucleus, and a plurality of sales companies, that of apparel manufacturers, that of sewing companies and that of textile companies are connected to each other. When a business instruction is sent from each terminal provided in each of the sales companies, the apparel manufacturers, the sewing companies and the textile companies, the database management system connected to each terminal to be accessible to each other through a public telephone line suitably retrieves various data necessary for supporting the business from a plurality of databases of the integrated DB, and outputs data to satisfy the terminal.

15 Claims, 13 Drawing Sheets

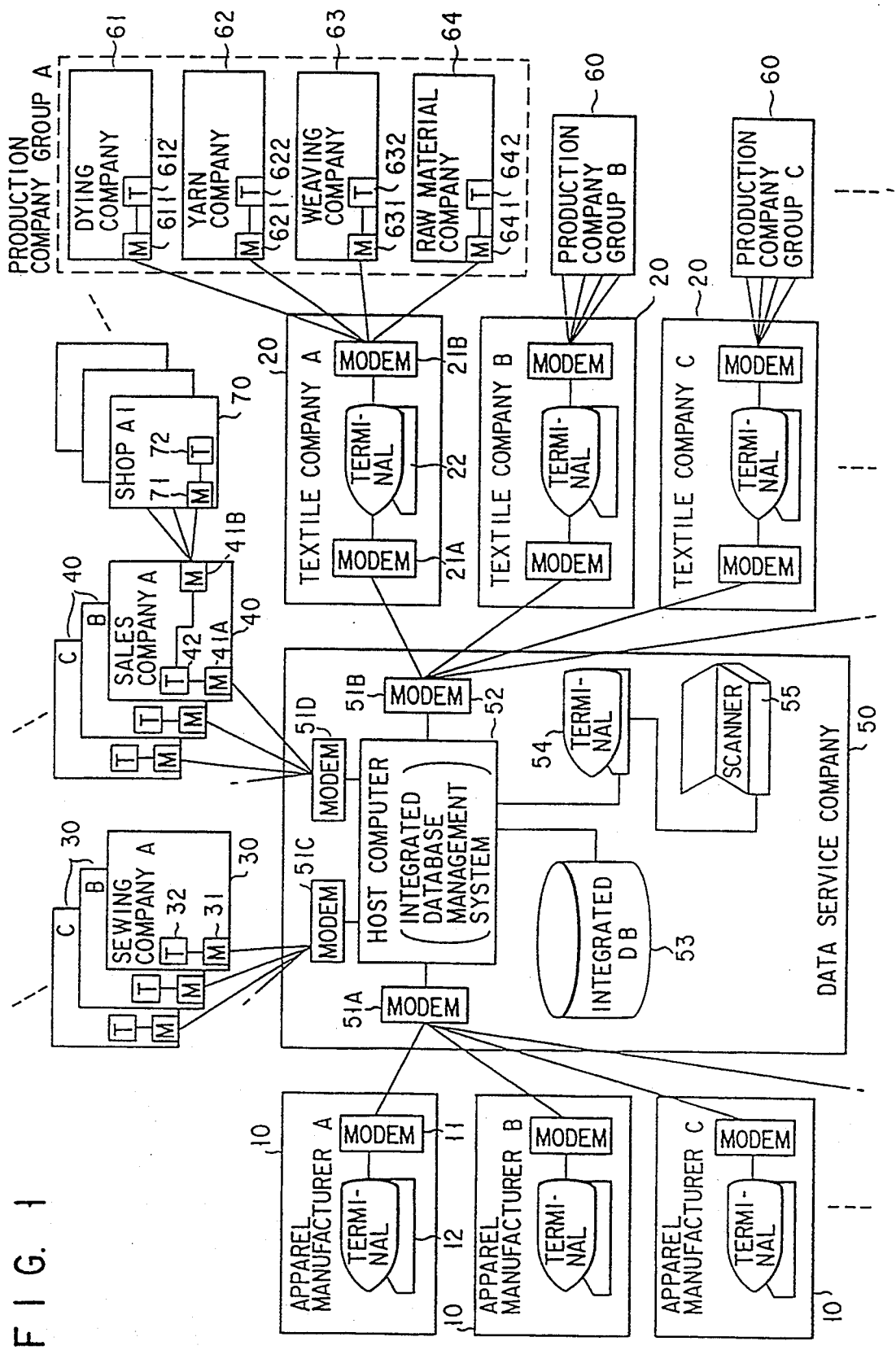
F I G. 1

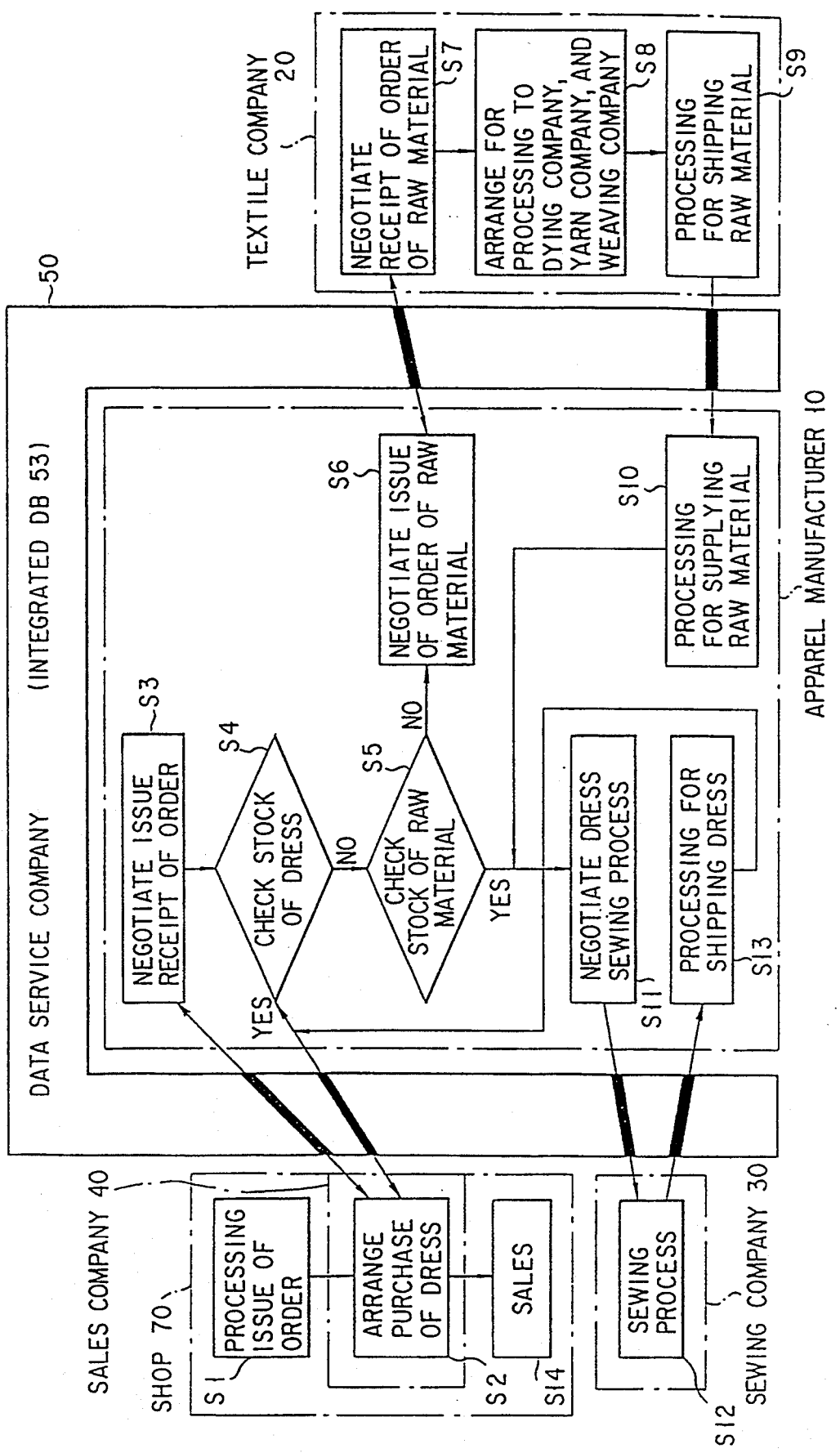
F I G. 4

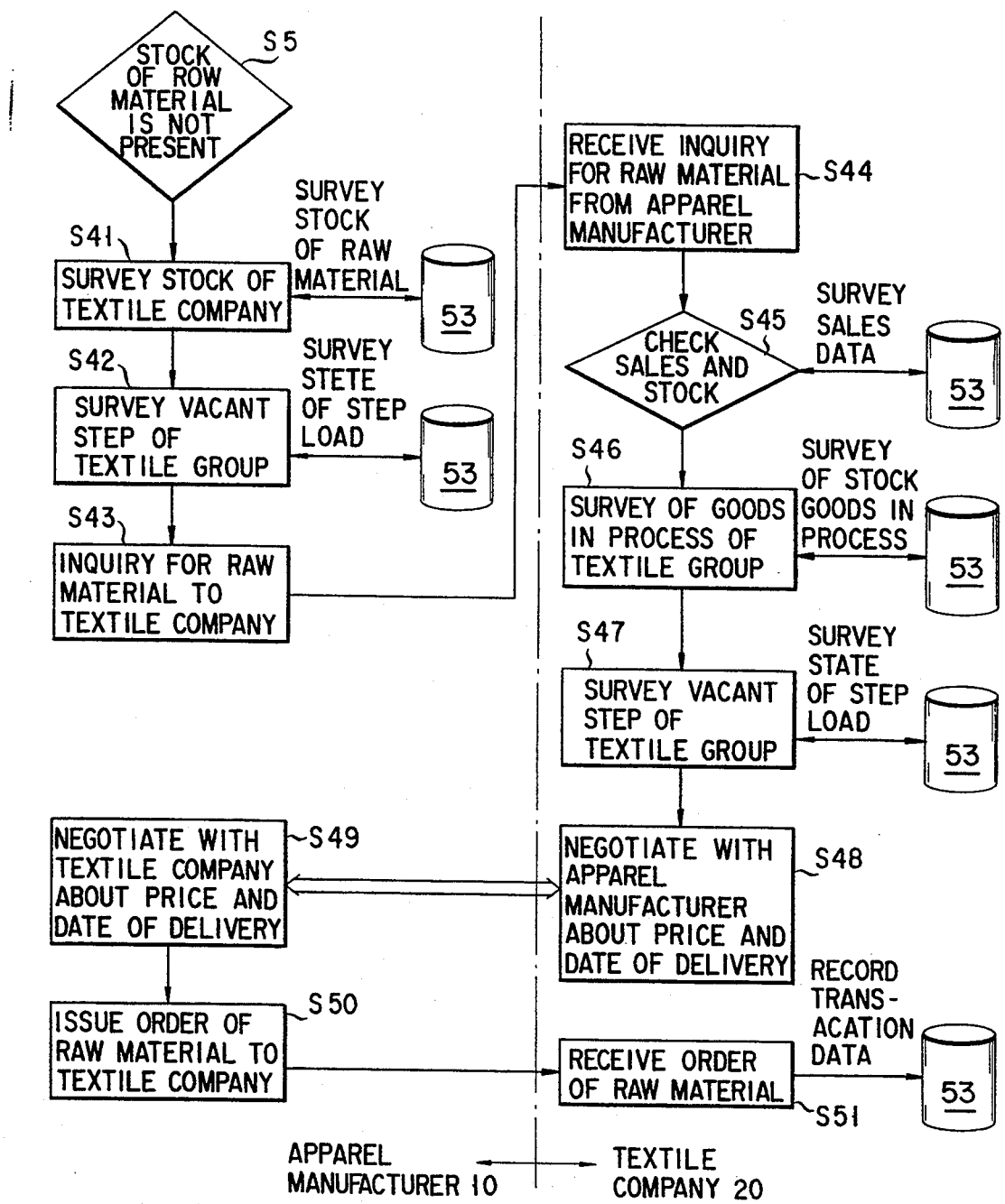
F I G. 6

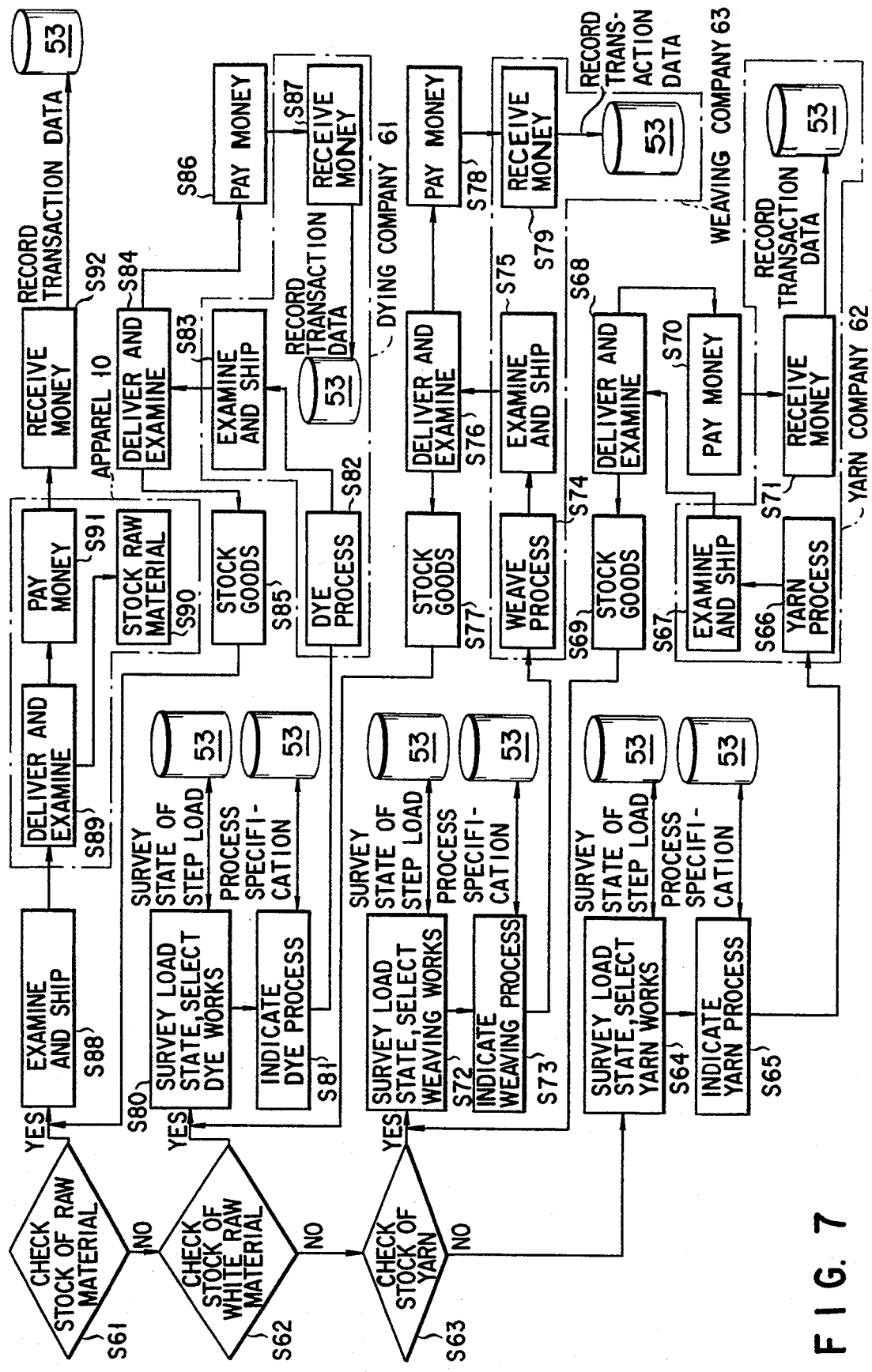
F I G. 7

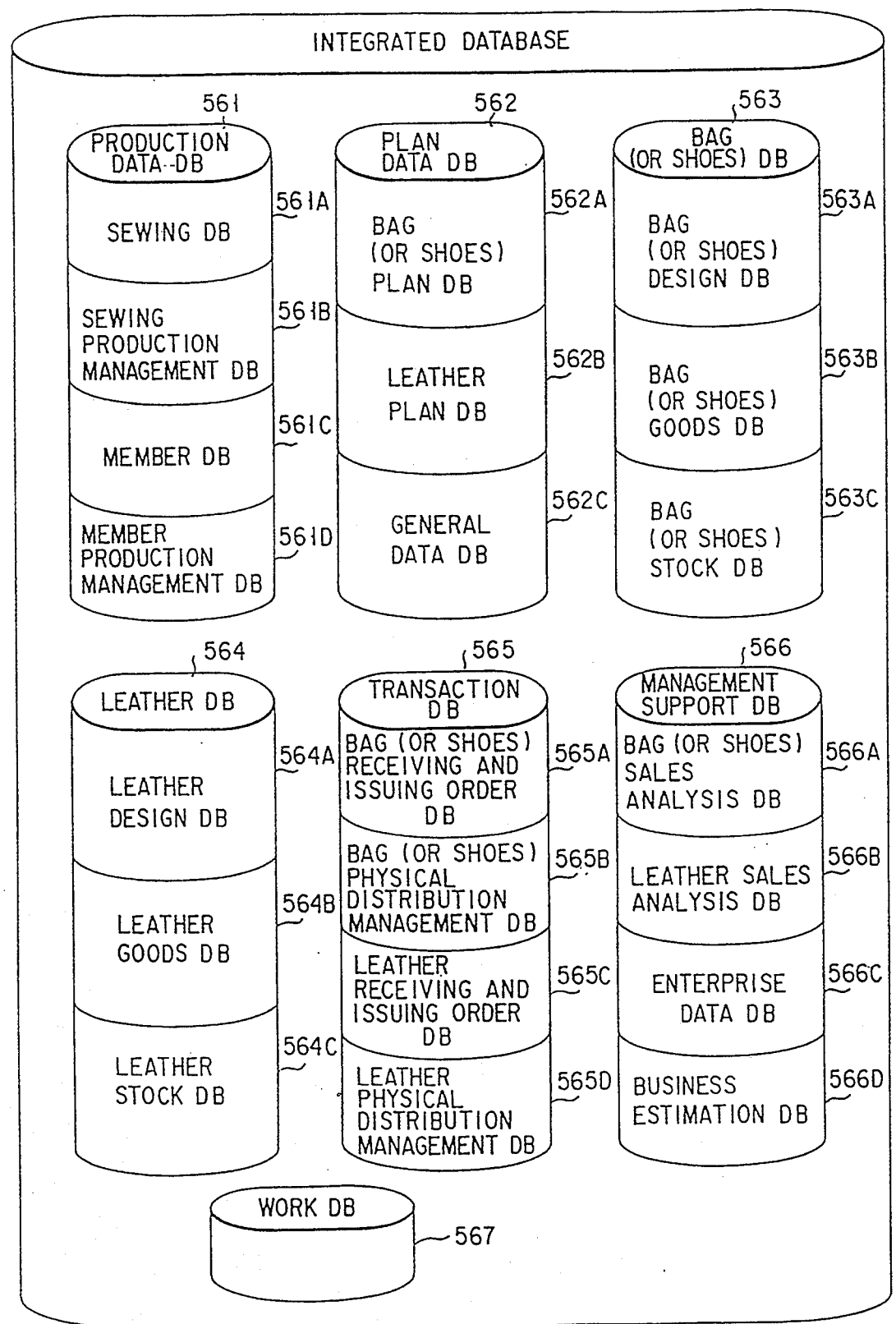
F I G. 13

DATA PROCESSING NETWORK HAVING A PLURALITY OF INDEPENDENT SUBSCRIBERS

BACKGROUND OF THE INVENTION

1. Field of the Invention

The present invention relates to a data service network system opened to, for example, an apparel industry and, particular to a data processor using a database integrated by a computer network for electrically processing data relating to various types of business transactions ranging from the manufacture of materials to the sales of dresses or bags in a clothing industry and a bag industry.

2. Description of the Related Art

In order to rationalize business transactions of issuing or receiving orders in the filed of the clothing industry, A VAN (Value-Added Network) has recently been widely used in connection with mainly sportswear. For example, an ASNET of Asics Corporation using FEN-ICS (trademark) is known. The ASNET is mainly designed to grasp the state of the sales at the shops and that of the stock.

Other than the above network, several data networks have been tried. However, the main purpose of using such data networks is that slip processing on issuing and receiving orders is electronically performed to rapidly send the slip through a communication network.

Therefore, even if such a data network is formed, the use of such the network, in many cases, is limited to the improvement of efficiency of sending slips on issuing and receiving orders.

The reason can be explained as follows:

The processes ranging from the manufacture of materials to the sales of dresses are shared by many enterprises (companies). Data necessary for business activity is dispersively kept in each company. In actuality, even in the company, a person in charge of each business activity holds business data, and there is no system in which each data is systematically connected and used.

Due to this, in the apparel industry dealing with the clothes, which are produced in many types of goods and a small quantity, particularly high-quality woman's dresses, though the sale cycle of the clothes as products is short (for example, two or three months), it takes considerably much time to perform the process, which is from the plan of, yarn, raw material and the dress, the manufacture of the member of raw material to sewing for producing the dresses (for example, one and half year).

Therefore, there is a large time-lag between the time when the dress is planned and the time when the dress is actually sold. Due to this, the trend expected at the time of planning the dresses is different from the trend at the time of actually selling the dresses, a large number of goods are returned and a large number of stocked goods are often increased. Conversely, if the trend expected at the time of planning the dresses agrees with the trend at the time of actually selling the dresses, such dresses are sold out soon. Therefore, even if such dresses are additionally manufactured, in the present state, the additional manufacture of the dresses does not meet the time when the dresses are selling well.

Therefore, if it is possible to integrate various types of data relating to the manufacture of the material to the sales of the finished goods, which the companies individually possess, into one database system as considering the systematic use of data, and to form a data work system, which can be mutually used among the companies, on condition that the business secret is kept, high-grade data service can be realized.

Therefore, it is obvious that time-lag and the number of the stocked goods and the number of returned goods can be reduced and that the additional manufacture can be performed at the time when goods are selling well as checking the sales trend.

The above-motioned points can be applied to the case of in a bag and shoes industries dealing with products, which are produced in many types of goods and a small quantity in the same case as in the apparel industry.

SUMMARY OF THE INVENTION

In consideration of the above-mentioned problems, the present invention has been made, and an object of the present invention is that various types of data relating to the manufacture of the material to the sales of the finished goods, which the companies individually possess, is integrated into one database system as considering the systematic use of data, and that a data work system, which can be mutually used among the companies, is formed on condition that the business secret is kept, thereby realizing high-grade data service.

According to a first aspect of the present invention, there is provided a data processing apparatus using an integrated database, comprising an integrated database for storing data of a series of business of planning, manufacturing and selling products produced in many types of goods and a small quantity and their material; and control means, connected to the integrated database and connected to each terminal of a plurality of different subscribers performing the series of business of planning, manufacturing and selling products and their material to be accessible to each other through a communication line, for suitably retrieving various data necessary for supporting the business from the integrated database in accordance with the business requirement of each terminal, and for outputting data to the terminal to satisfy the requirement, and wherein the integrated database includes a plan data database for storing at least data necessary for planning and manufacturing the product and data necessary for planning and manufacturing the material; a product database for storing at least data of the production and sales of the product to be actually sold and data of goods stock of the product; a material database for storing at least data of the manufacture of material to be used as goods and stock data of material; and a business history database for storing at least business history data of the product and business history data of material.

According to a second aspect of the invention, there is provided a data processing network using an integrated database, comprising a first terminal provided in each of a plurality of subscribers selling products produced in many types of goods and a small quantity; a second terminal provided in each of a plurality of subscribers planning and selling the products; a third terminal provided in each of a plurality of subscribers processing and manufacturing the products; a fourth terminal provided in each of a plurality of subscribers planning, manufacturing and selling material of the products; an integrated database for storing data of a series of business of planning, manufacturing, and selling the products and material; and control means, connected to the integrated database and connected to the first to fourth terminals of a plurality of different subscribers performing the series of business of planning, manufacturing and selling products and their material to as to be accessible to each other through a communication line, for suitably retrieving various data necessary for supporting the business from the integrated database in accordance with the business requirement of each terminal, and for outputting data to the terminal to satisfy the requirement, and wherein the integrated database includes a plan data database for storing at least data necessary for planning and manufacturing the product and data necessary for planning and manufacturing the material; a product database for storing at least data of the production and sales of the product to be actually sold and data of goods stock of the product; a material database for storing at least data of the manufacture of material to be used as goods and stock data of material; and a business history database for storing at least business history data of the product and business history data of material.

According to a third aspect of the invention, there is provided a method for processing data by use of an integrated database, comprising the steps of forming an integrated database for storing data of a series of business of planning, manufacturing and selling products produced in many types of goods and a small quantity and their material; providing a terminal, connected to the integrated database, for performing the series of business of planning, manufacturing and selling the products and their material to a plurality of different subscribers; and suitably retrieving various data necessary for supporting the business from the integrated database in accordance with the business requirement of each terminal, and outputting data to the terminal to satisfy the requirement, and wherein the integrated database includes a plan data database for storing at least data necessary for planning and manufacturing the product and data necessary for planning and manufacturing the material; a product database for storing at least data of the production and sales of the product to be actually sold and data of goods stock of the product; a material database for storing at least data of the manufacture of material to be used as goods and stock data of material; and a business history database for storing at least business history data of the product and business history data of material.

In other words, according to the present invention, there is formed a data service network in which an integrated database in which various business data dispersively kept in each part in an apparel industry including plan, manufacture, and sales relating to a dress as a product and textile raw material as material is integrated is provided as the nucleus. Then, when a business instruction is sent from each terminal provided in a plurality of different subscribers performing the series of business such as a plurality of sales companies, that of apparel manufacturers, that of sewing companies or that of textile companies, a database management system, which is connected to each terminal to be accessible to each other through a public telephone line, suitably retrieves various data necessary for supporting the business from a plurality of databases of the integrated database, and outputs data to satisfy the terminal.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a view showing the structure of a first embodiment of the present invention in case that the present invention is applied to an apparel industry;

FIG. 4 is a flow chart conceptually showing a process of issuing an order of dresses and a process of supplying dresses, including the processes ranging from the manufacture of raw material to the sales of the dresses;

FIG. 6 is a flow chart showing steps S5 to S7 of FIG. 4 in more detail;

FIG. 7 is a flow chart showing steps S7 to S10 of FIG. 4 in more detail in a post-dying case;

FIG. 13 is a view showing the structure of an integrated database in a case that the present invention is applied to the bag (or shoes) industry.

DETAILED DESCRIPTION OF THE PREFERRED EMBODIMENTS

Figure 2:
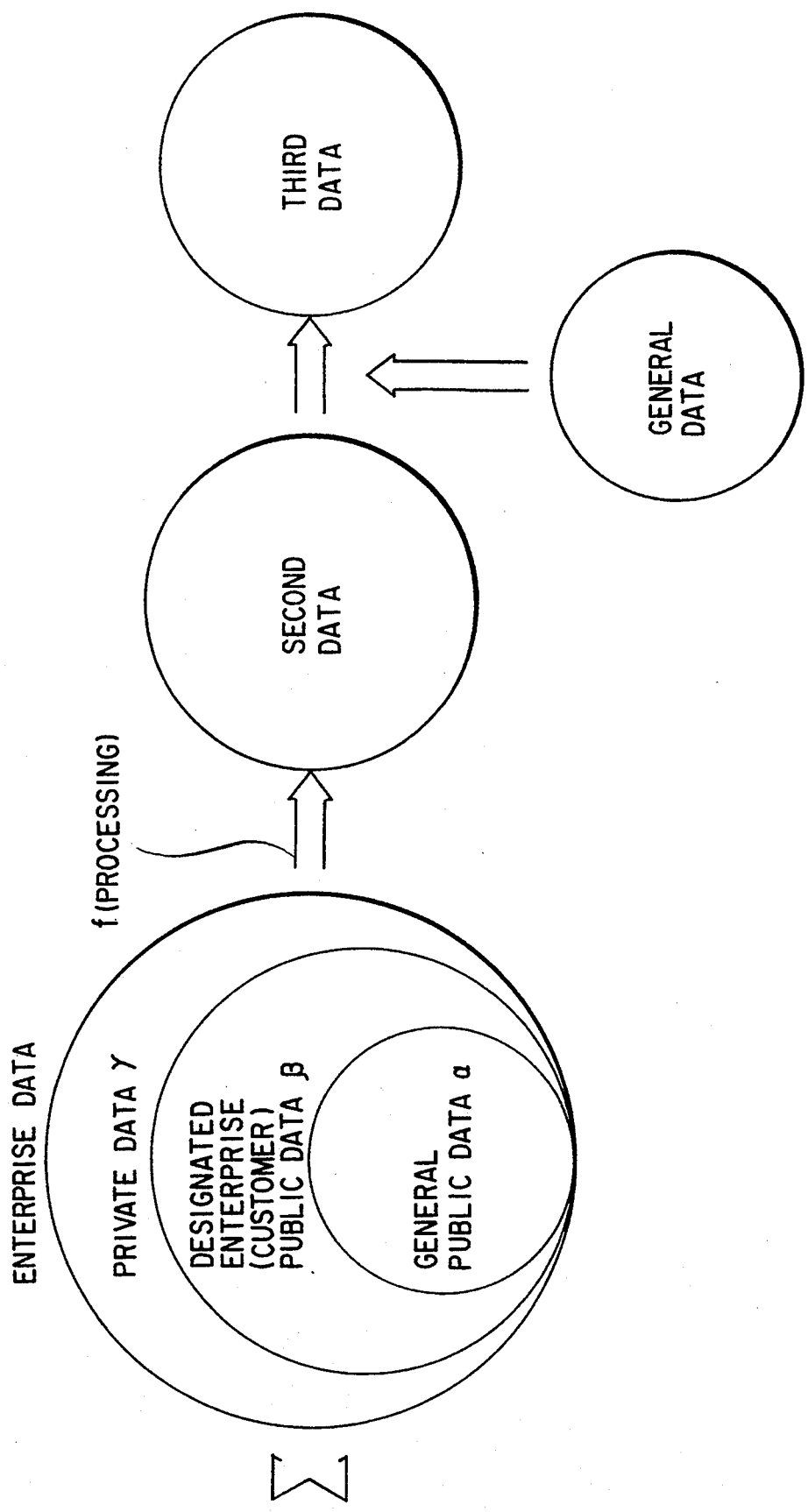
FIG. 2 is a view showing the outline of data processing by data service company.

Embodiments of the present invention will be explained with reference to the drawings.

FIG. 1 is a view showing the structure of a first embodiment of the present invention in a case that the present invention is applied to the apparel industry. In FIG. 1, a data service company 50 is distributed among a plurality of apparel manufacturers (A, B, C, . . . ) 10, a plurality of textile companies (A, B, C, . . . ) 20, a plurality of sewing companies (A, B, C, . . . ) 30, and a plurality of sales companies (A, B, C, . . . ) 40, and thereby a data offering service network is expanded. Also, in the data offering service network, other companies such as a distribution company and a dying company, which are related to the above-mentioned companies, can be connected.

In the data service company 50, there is provided a host computer (integrated database management system) 52 including a computer hardware and software. The host computer 52 is connected to the apparel manufacturers 10, the textile companies 20, sewing companies 30, and sales companies 40 through a public telephone line by use of modems 51A, 51B, 51C, and 51D in order to perform the data communication between the respective companies and to retrieve and output data from an integrated database (DB) 53 to be detailed later. Moreover, a work station level terminal 54 including a keyboard, a high resolution display, a printer, is connected to the host computer 52, and a scanner 55 is connected to the terminal 54.

Each apparel manufacturer 10 has a data terminal 12 connected to the host computer 52 of the data service company 50 by a modem 11. The terminal 12 is a work station level terminal including a keyboard, a high resolution display, a printer. For example, goods data is displayed on a display screen 13 by characters, and image data of a textile can be displayed thereon. Also, a superimposing process can be performed so as to match a design of a dress prepared by a design CAD.

Each textile company 20 plans the textile and instructs the production of the textile. Then, similar to the apparel manufacturers 10, in the textile company 20, there is provided a terminal 22, which is connected to the host computer 52 of the data service company 50 through the public telephone line by use of a modem 21A. In the terminal 22, the superimposing process cannot be performed unlike the terminal 12 of the apparel company 10, however, a change of a design of the textile, and the preparation of the textile can be performed.

Moreover, each textile company 20 has production company groups (A, B, C, . . . ) 60, as their subsidiary companies, including a textile dying company 61, a yarn company 62, a weaving company 63, a textile raw material company 64, which are related to each textile company 20 through the public telephone line by use of a modem 21B, and which carry out the actual production of the textiles. The respective companies 61, 62, 63, 64 have modems 611, 621, 631, 641 and terminals 612, 622, 632, 642. The textile companies 20 transmit instruction of production to these production companies on-line, and thereby a real time production is carried out. In the figure, one company of each type of the production companies 61 to 64 is typically shown. However, in actuality, each type of the production companies 61 to 64 often includes a plurality of companies.

Similarly, there is provided a terminal 32, which is connected to the host computer 52 of the data service company 50 through the public telephone line by use of a modem 31 in each of sewing companies 30. Also, there is provided a terminal 42, which is connected to the host computer 52 of the data service company 50 through the public telephone line by use of a modem 41A in each of sales companies 40. Moreover, each sales company 40 has shops 70, which actually sells dresses, as a subsidiary. Each shop also has a modem 71 and a terminal 72, so that sales can be transmitted to the sales company on-line. In other words, in this case, the terminal 72 of each shop 70 has a POS terminal function.

As shown in FIG. 2, the data service company 50 collects enterprise data of each of the apparel manufacturers 10, the textile companies 20, sewing companies 30, sales companies 40, and, depending on the case, production company groups 60 and shops 70 in the network constructed among these companies. Then, the data service company 50 processes data to be converted to second data, and adds general data (e.g., weather forecast, etc.) to the second data to be converted to third data. In this case, enterprise data can be classified into general public data ($\alpha$), designated enterprise (customer) public data ($\beta$), and subscriber private data ($\gamma$).

General public data ($\alpha$) is data whose public offering of data can be recognized by a company, which is a data source. Designated enterprise public data ($\beta$) is data, which may be open to only companies having a business transaction with the company, which is the data source. Private data (y) is private data of the company which cannot be leaked to the other companies. Therefore, when the data service company 50 offers enterprise data (first data) to each company (subscriber), it is needed that the range of data available be managed or data security be maintained. In this embodiment, there is used a method in which a subscriber is specified by an ID and a password to maintain security. Or, there may be used a method in which data is offered in the form of second or third data whose source is made unclear without offering raw data.

The data service company 50 offers the following services:

1. Data servicing for Apparel Manufacturers
   (1) Sales result of self-company: a transaction result counted at real time;
   (2) Entire sales result of the apparel manufacturers in the network: data of sales (including transactions) result counted by the network;
   (3) Entire sales result of the sales related companies in the network: data of sales counted by the terminal (POS terminal) 72 of each shop 70;
   (4) Trend data: Trend data in domestic and overseas;
   (5) Data of production companies in the network: introduction data of the business and goods of the production companies participated in the network; and
   (6) General market and shop front research.

Particularly, security of above services (1), (2), and (3) is needed.

2. Data servicing for sales related companies
   (1) Sales result of self-company: a transaction result counted at real time by the terminal (POS terminal) 72 of each shop 70 belonging to the self-company;
   (2) Entire sales result of the sales related companies in the network: sales data counted by the terminal (POS terminal) 72 of each shop 70 in the network;
   (3) Trend data: Trend data in domestic and overseas;
   (4) General market and shop front research; and
   (5) Introduction of the apparel manufacturers in the network: introduction data of the goods of the apparel manufacturers participating in the network and brand names.

Particularly, security of above services (1) and (2) is needed.

3. Data servicing for textile plan
   (1) General data: data of other than the fashion such as politics, economy, culture and customs, weather, environment, etc.;
   (2) Trend data in clothes: technical data of color, textile, and style;
   (3) Consumer data: data of customers;
   (4) Market data: market data of other than consumer data;
   (5) Data of sales result: sales data of self-company and other companies; and
   (6) Other data.

Particularly, security of above services (3), (4), and (5) is needed.

Figure 3:
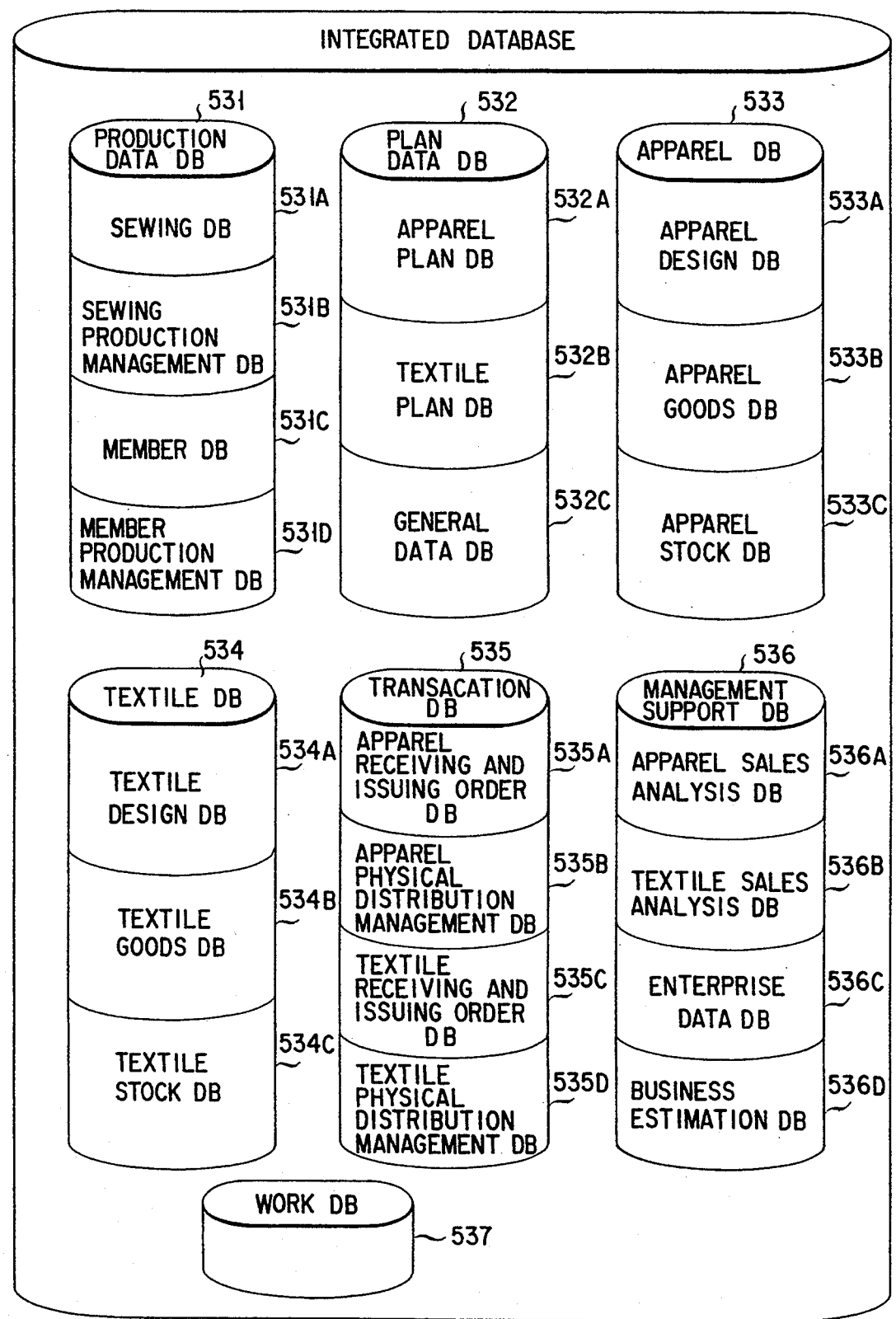
FIG. 3 is a view showing the structure of an integrated database.

As shown in FIG. 3, the integrated database (DB) 53 of the data service company 50 available for obtaining the above-mentioned services comprises a production data DB 531, a plan data DB 532, an apparel DB 533, a textile DB 534, a transaction DB 535, a management support DB 536, and a work DB 537.

The production data DB 531 comprises a sewing DB 531A, a sewing production management DB 531B, a member DB 531C, and a member production management DB 531D. The sewing DB 531A is a database in which various data of product processes of manufacturing dresses is stored. The sewing production management DB 531B is a database in which data of a working load sate of each sewing company is stored. The member DB 531C is a database in which various processing data necessary for manufacturing textiles is stored. The member production management DB 531D is a database in which data of a process load state of each of the production companies such as the yarn company, dying company, sewing company is stored. It is noted that other various data relating to the manufacturing process of sub-materials such as buttons, ribbons, etc., dyestuffs, process ability, and the like is stored in the production data DB 531.

The plan data DB 532 comprises an apparel plan DB 532A, a textile plan DB 532B, and a general data DB 532C. The apparel plan DB 532A is a database in which necessary data for planing and manufacturing the apparel is stored.

The textile plan DB 532B is a database in which necessary data for planing and manufacturing textiles is stored. For example, data necessary for producing the textiles such as a goods code, necessary material, processing step, company dealing in textiles, security level, and the like, is stored in the textile plan DB 532B. In this case, the security level is data showing the classification of general public data ($\alpha$), designated enterprise public data ($\beta$), and subscriber private data ($\gamma$). Therefore, if designated enterprise public data ($\beta$) is set, data for specifying the designated subscriber is of course recorded. The textile company 20 makes the production plan based on data retrieved from the textile plan DB 532B, and instructs the production company group 60 of their subsidiary to start the production of the textile.

The general data DB 532C is a database in which various types of data of the daily life such as life style, moves, the mass media, that is, data of other than data directly concerning to the dresses and textiles, is stored. In the general data DB 532C, there is also stored general data such as a stock market, movement of exchange, the production of silk in a foreign producing center, the production of wool and the like.

The apparel DB 533 comprises an apparel design DB 533A, an apparel goods DB 533B, an apparel stock DB 533C. The apparel DB 533 is a database, which is expanded in more detail to concentrate on the manufacture of the dresses. The apparel design DB 533A is a database in which design data of what dress is designed is stored. The apparel goods DB 533B is a database in which data relating to the production and sales of goods is stored. In this case, it is the goods, that is, the dresses, which are actually manufactured, exhibited to be on sale. In other words, the dresses, which are designed from the designs stored in the apparel design DB 533A, and produced on a commercial basis. That is, the goods to which a goods code is added to be ready to be on sale. The above-mentioned includes data of what dress is designed, what textile is used, and what sewing process is carried out. The apparel stock DB 533C is a database in which goods in stock are stored. In this case, goods in stock include the stock, which the sales company 40 or apparel manufacturer 10 has, and goods in process, which the sewing company 30 has.

Regarding data of these apparel goods DB 533B and apparel stock DB 533C, similar to the textile plan DB 532B, the access of each subscriber is needed to be limited in accordance with the security level. That is, it is needed that the security is fully considered and that the necessary data is obtained. For example, an ID number of the company is used as a key, and the security must be maintained based on the individual data of the company relating to what business transaction the company has.

The textile DB 534 is a database, which is expanded in more detail to concentrate on the manufacture of the textiles. The textile DB 534 comprises a textile design DB 534A, a textile goods DB 534B, and a textile stock DB 534C. The textile design DB 534A is a database in which design data of what pattern of textile is manufactured is stored. For example, the textile DB 534A stores an item code and static image data of the textile are stored item by item of the registered textiles. The textile goods DB 534B is a database in which various data necessary for manufacturing the textile for goods, such as a price, a production result, etc. is stored. More specifically, the textile goods DB 534B stores an item code and data relating to the textile such as a selling period, target season, color, pattern, raw material, type of weaving, condition of order, standard price, company dealing in the textile, etc., item by item as character data. The textile stock DB 534C is a database storing data of the stock of the textile company 20, and goods in process of each of the textile dying company 61, yarn company 62, weaving company 63, and the stock of the apparel manufacturer 10. Similar to the apparel stock DB 533C, it is needed that necessary data is fetched from the ID number and the record of the mutual business relation in the range, which does not deviate from the security level, in accordance with the security set item by item.

The transaction DB 535 carries out a due date management and an electronic settlement of accounts. The transaction DB 535 comprises an apparel receiving and issuing order DB 535A, an apparel physical distribution management DB 535B, a textile receiving and issuing order DB 535C, and a textile physical distribution management DB 535D. The apparel receiving and issuing order DB 535A is a database in which transaction history data of the apparel is stored. The textile receiving and issuing order DB 535C is a database in which transaction history data of the textile is stored. The textile receiving and issuing order DB 535C sequentially inputs and renews the quantity of the textiles every time when the order is received and issued or canceled every item code. Also, the security level relating to business result data of the textile is recorded therein.

The management support DB 536 is used to serve second data, which is various types of data necessary for the actual management plane or management decision, and which is obtained by processing various types of databases, and process data, that is, third data, which the data service company 50 analyzes in their own analysis method, in other words, data whose source becomes unclear. The management support DB 536 comprises an apparel sales analysis DB 536A, a textile sales analysis DB 536B, an enterprise data DB 536C, and a business estimation DB 536D. The apparel sales analysis DB 536A is a database storing data of which the sales of the apparel is analyzed. The textile sales analysis DB 536B is a database storing which of the sales of the textile are analyzed. The enterprise data DB 536C is a database storing data of the business state of each enterprise and the transaction state.

The work DB 537 is a database to be used as a work memory for temporarily storing various data, which is necessary when the host computer 52 (integrated database management system) executes various processes.

According to the above-mentioned structure, the following will explain how the integrated data base 53 supports a process of issuing an order of dresses and a process of supplying dresses, including the processes ranging from the manufacture of raw material to the sales of the dresses.

FIG. 4 is a flow chart conceptually showing the process of issuing an order of dresses and the process of supplying dresses, including the processes ranging from the manufacture of raw material to the sales of the dresses.

In accordance with issue order processing by the shop 70 (step S1), the sales company 40 asks the apparel manufacturer 10 to make arrangements for the purchase of dress through data service company 50 (integrated DB 53) (step S2).

The apparel manufacturer 10 negotiates with the sales company 40 and receives the order of the dress through data service company 50 (integrated DB 53) (step S3). Then, if there is the stock of the dress (step S4), the apparel manufacturer 10 ships the dress to the sales company. If there is no stock of the dress, the apparel manufacturer 10 checks the stock of the raw material (step S5). If there is no stock of the raw material, the apparel manufacturer negotiates with the textile company 20 about issuing the order of the raw material through data service company 50 (integrated DB 53) (step S6).

The textile company 20 negotiates with the apparel manufacturer 10 about receiving the order of the raw material through data service company 50 (integrated DB 53) (step S7). If the negotiation is concluded, the textile company 20 asks the textile dying company 61, yarn company 62, and weaving company 63 to make arrangements for processing (step 8). If the raw material is completed, processing for shipping raw material such as transmission of necessary data to the apparel manufacturer 10 through data service company 50 (integrated DB 53) is performed (step S9), and the completed raw material is shipped to the apparel manufacturer 10.

If the apparel manufacturer 10 receives the raw material and data from the textile company 20, necessary processing for supplying raw material is performed (step S10). Then, the apparel manufacturer 10 negotiates with the sewing company 30 through the data service company 50 (integrated DB 53) (step S11).

The sewing company 30 sews the dress by use of the raw material supplied from the apparel manufacturer 10 in accordance with processing data sent through the data service company 50 (integrated DB 53) (step S12). If the dress is completed, processing for shipping the dress, such as transmission of necessary data to the apparel manufacturer 10 through the data service company 50 (integrated DB 53), is performed and the completed dress is shipped to the apparel manufacturer 10.

If the apparel manufacturer 10 receives dress and data from the sewing company 30, the apparel manufacturer 10 performs necessary processing for supplying dress and processing for shipping dress to the sales company 40 (step S13). Then, dress is sent to the sales company 40 and necessary data is sent to the sales company 40 through the data service company 50 (integrated DB 53).

If the sales company 40 receives the dress and data from the apparel manufacturer 10, the sales company 40 performs necessary processing for supplying dress and carries the dress to the shop 70 by which the dress is ordered, and the dress is sold at the shop 70 (step S14).

Figure 5:
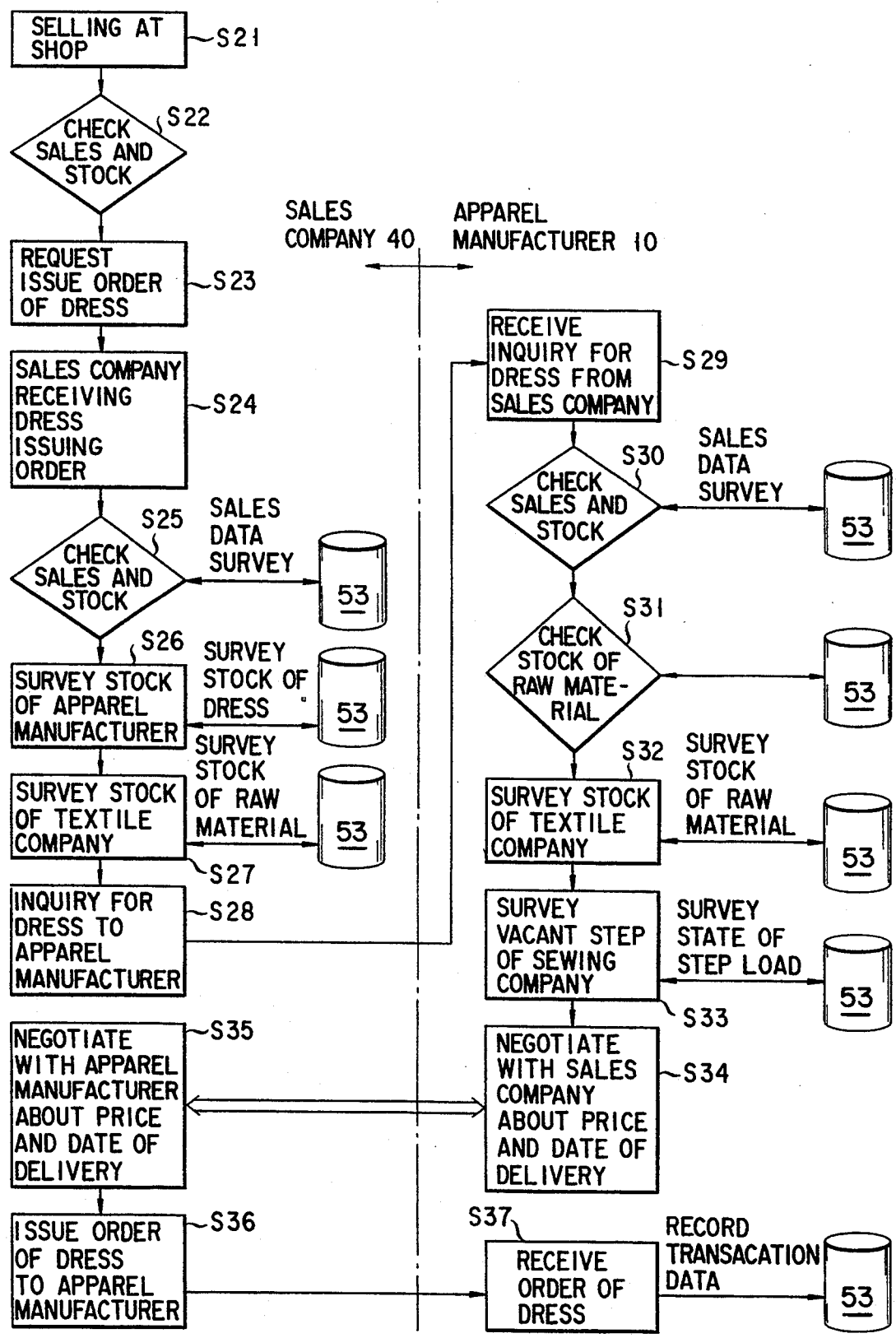
FIG. 5 is a flow chart showing steps S1 to S3 of FIG. 4 in more detail.

The above steps S1 to S3 will be explained in more detail with reference to FIG. 5 as follows:

Data of the sales activity of each shop 70 is inputted and recorded in the terminal 72 having the POS terminal function (step S21). Data is stored in a local database of the corresponding shop 70, and is used in the sales management of the shop 70, financial management, analysis of good seller dress and that of bad seller dress, etc.

Each shop 70 checks the sales activity every fixed period of time to examine the sales state of the individual goods and the stock state (step S22). Then, the shop 70 issues the order of the dress to the main office (sales company 40) (step S23). This work is performed through the terminal 72 connected to the main office.

If the sales company 40 receives the order of the dress from the shop 70 (step S24), the sales company 40 arranges the request from each shop 70, and performs the issue of the order of the dress to the apparel manufacturer 10. This work comprises the operations, that is, dress sale and stock check, dress stock survey of the apparel manufacturer 10, raw material stock survey of the textile company 20, inquiry for dress to the apparel manufacturer 10, negotiation with the apparel manufacturer 10 about price and date of delivery, and issue order of dress to the apparel manufacturer 10. These operations are carried out by use of work support service due to the integrated DB 53 of the data service company 50.

These operations will be explained in detail as follows.

(1) Dress sales and stock check (step S25)

In the sales company 40, a person (operator) in charge of issuing the order of dress, operates the work station level terminal 42 of the self-company connected to the integrated database management system 52 of the data service company 50 through the public telephone line, and like. The operator selects the corresponding work from the work menu displayed on the display screen of the display, and inputs the code of the dress to be processed as an object.

The integrated data base management system 52 extracts and processes data of issue order of the self-company stored in the apparel receiving order DB 535A of the integrated DB 53. Then, a first window is opened on the display of the terminal 42 of the sales company 40, and data of past issuing order of the self-company is displayed as a history of issuing order. In this case, a name of the company who issues the order of the dress, the date of issuing order, the number of ordered goods, delivering date, the number of delivered goods, the examination result, etc., are displayed on the window.

The integrated data base management system 52 extracts and processes the analysis data of the self-company and other companies stored in the apparel sales analysis DB 536A of the integrated DB 53, so that analysis data of the past sales results at each shop of the self-company and the analysis data of general sales state of the similar goods are displayed in a second window.

In the second window, an estimation of future sales, a recommendable number of ordered goods, etc., are also displayed as required.

Moreover, the integrated data base management system 52 extracts and processes the stock data of the self-company and other companies stored in the apparel stock DB 533C of the integrated DB 53, so that the stock state of the self-company is displayed in a third window. In the third window, an estimation of the change of the future stock, etc., is displayed as required.

In consideration of data displayed on these three windows, the operator sets up a standard of the number of ordered goods, that of a delivering date, etc., and reduces the sizes of these windows as being opened, and the operator goes to the next step.

(2) Stock survey of apparel manufacturer (step S26)

The operator performs the stock survey of the dress to be processed as an object, by use of the first window.

More specifically, the corresponding work is selected from the work menu, the integrated data base management system 52 extracts and processes the stock data of the apparel manufacturer stored in the apparel stock DB 533C of the integrated DB 53. A fourth window is opened, and the stock state of the dress to be processed as an object of the apparel manufacturer 10 is displayed therein. In this case, the stock state to be extracted and displayed is not the actual stock state of the apparel manufacturer 10 but the stock state, which is in the range (designated enterprise public data D) which the apparel manufacturer 10 may publish only to the sales company 40 (customer). Due to this, the integrated database management system 52 determines data to be extracted and displayed with reference to the customer registration, and the sales company ID. In this case, not only the stock state of the apparel manufacturer 10 but also a new manufacture schedule, the stock of raw material, the number of orders of goods, which can be received, price, delivering date, etc., can be displayed.

The operator confirms the order receiving state of the manufacturer 10, and goes to the next step.

(3) Stock survey of the textile company (step S27)

Since the number of manufacturing days of the dress largely differs, depending on whether the stock of material is present or not, the operator surveys the stock of material on the market.

More specifically, if the operator selects the corresponding work from the work menu, the integrated database management system 52 extracts raw material to be used from the apparel goods DB 533B of the integrated DB 53 by use of the dress code. Then, the textile stock DB 534C is checked, and a fifth window is opened, and the stock state of the necessary raw material is displayed. In this case, the stock state to be displayed is not the actual stock state of the textile company 20 having business relation with the apparel manufacturer 10 but the stock state, which is in the range (general public data a) which the textile company may publish. Then, the integrated database management system 52 displays data with reference to the customer registration, and the sales company ID. In this case, not only the stock state of the the textile company 20 but also a new manufacture schedule, the number of orders of goods, which can be received, price, delivering date, etc., can be displayed.

Moreover, the integrated database management system 52 opens a sixth window, and displays a recommendable issue order plan including the number of issuing orders, price, and delivering date based on data displayed in the above-mentioned five windows and related data, if the operator wishes to do so.

The operator considers the above data, and makes a plan of issuing order, and goes to the next step.

(4) Inquiry for Dress to Apparel Manufacture (step S28)

The operator selects the corresponding work from the work menu, and makes an inquiry for the dress to the apparel manufacturer based on the plan of issuing order.

The integrated database management system 52 sends necessary data to the apparel manufacturer 10 by use of an electronic mailing function.

The operator closes the windows used in the above-explained steps, and goes to the work of issuing the order of the dress.

(5) Receive Inquiry for dress from sales company (step S29)

In accordance with the inquiry for the dress from the sales company 40, a person (operator) of the apparel manufacturer 10, who receives the order, operates the work station level terminal (working computer) 12, which is connected to the integrated database management system 52 of the data service company 50 through the public telephone line to perform the work receiving the inquiry.

More specifically, the inquiry mail for the dress from the sales company 40 is selected from the electronic mail sent through the data service company 50, and an inquiry receiving date, and a response schedule date are inputted. Data is returned to the terminal 42 of the sales company 40 through the data service company 50, and a person of the sales company 40 in charge of issuing the order of the dress, can confirm data anytime.

In the apparel manufacturer 10, the work of issuing the order of the dress comprises the steps of shipping the dress (sales state of the dress), checking the stock of the dress, checking the stock of raw material, surveying the stock of raw material of the textile company, surveying the vacant step of the sewing company 30, negotiating with the sales company 40 about the price and the delivery date, and receiving the order of the dress from the sales company 40. These steps are carried out by use of the work support service of the integrated DB 53 of the data service company 50.

(6) Check the sales state and stock (step S30)

In the apparel manufacturer 10, a person (operator) in charge of receiving the order, selects the corresponding work from the work menu and inputs the code of the dress to be processed as an object, the integrated database management system 52 extracts and processes data data of receiving order of the self-company stored in the apparel receiving and issuing order DB 535A of the integrated DB 53. Then, the first window is opened, and data of past receiving order of the self-company is displayed as a history of receiving order. In this case, a name of the company who receives the order of the dress, the date of receiving order, the number of received goods, shipping date, and the number of shipped goods, etc., are displayed on the window.

The integrated database management system 52 extracts and processes analysis data of the self-company and other companies stored in the an apparel sales analysis DB 536A of the integrated DB 53, so that analysis data of the past manufacture and shipment results of the self-company, analysis data of the general sales state of the plurality of the sales companies 40, and analysis data of general sales state of the similar goods are displayed in the second window. In the second window, an estimation of future shipment, a recommendable number of received orders of goods, etc., are also displayed as required.

Moreover, the integrated database management system 52 extracts and processes the stock data of the self-company stored in the the apparel stock DB 533C of the integrated DB 53, so that the stock state of the self-company is displayed in the third window. In the third window, an estimation of the change of the future stock, etc., is displayed as required.

In consideration of data displayed on these three windows, the operator sets up a standard of the number of received orders of goods, a delivering date, etc., and reduces the sizes of these windows as being opened, and the operator goes to the next step.

(7) Check stock of raw material (step S31)

If the corresponding work is selected from the work menu, the integrated database management system 52 opens the fourth window, and extracts the material code to be used from the apparel goods DB 533B of the integrated DB 53. Then, the integrated database management system 52 checks the stock of the self-company in the textile stock DB 534B, and displays the stock state of the necessary raw material. In this case, the number of dresses, which can be manufactured from the stock raw material, can be displayed.

(8) Survey stock of textile company (step S32)

If the stock of raw material of the self-company is in short supply, the stock of raw material of the textile company 20 is performed.

More specifically, if the corresponding work is selected from the work menu, the integrated database management system 52 extracts and processes the stock data of the textile company stored in the textile stock DB 534C of the integrated DB 53. The fourth window is opened, and the stock state of the necessary raw material in the textile company 20 is displayed therein. In this case, the stock state to be displayed is not the actual stock state of the textile company 20 but the stock state, which is in the range (designated enterprise public data β) which the textile company 20 may publish only to the apparel manufacturer 10. Due to this, the integrated database management system 52 displays data with reference to the customer registration, and the apparel manufacturer ID. In this case, not only the stock state of the textile company 20 but also a new manufacture schedule, the stock of raw material, stock of the work half-finished, the number of orders of goods, which can be received, price, delivering date, etc., can be displayed.

The operator confirms the order issuing state of the textile company 20, and goes to the next step.

(9) Survey vacant step of sewing company (step S33)

The sewing process is surveyed after the stock of the raw material and the outlook for obtaining the raw material are confirmed by the above-mentioned stock check.

More specifically, if the corresponding work is selected from the work menu, the integrated database management system 52 opens the sixth window, and displays a schematic sewing specification obtained from the apparel goods DB 533B of the integrated DB 53 and a list of the suitable sewing companies 30, which are obtained from the enterprise data DB 536C. Moreover, the integrated database management system 52 opens one window for each of the plurality of sewing companies 30, and displays a sewing load state obtained from the sewing production management DB 531B of the integrated DB 53. In this case, the sewing load state to be displayed in this step is not the actual sewing load state of the sewing company 30 but the sewing load state, which is in the range (designated enterprise public data D) which the sewing company 30 may publish only to the apparel manufacturer. Due to this, the integrated database management system 52 displays data with reference to the customer registration, and the apparel manufacturer ID.

The operator considers the above data, and makes a plan of receiving the order, and goes to the next step.

(10) Negotiation about price and date of delivery (steps S34 and S35)

The person of the apparel manufacturer 10, in charge of receiving the order, sends the plan for receiving the order to the person of the sales company 40, in charge of issuing the order, by the electronic mail through the data service company 50. Thereafter, they exchange the electronic mail with each other to negotiate about the quantity of goods, the price, and date of delivery.

The person of the apparel manufacturer 10, in charge of receiving the order, can perform the process for receiving the order of the next dress while exchanging the electronic mail.

(11) Issuing and receiving order of dress (steps S36, S37)

If the negotiation about the quantity of dresses, the price, and the date of delivery is concluded, the person of the sales company 40, in charge of issuing the order, prepares an order list and sends the order list to the person of the apparel manufacturer 10, in charge of receiving the order, by the electronic mail through the data service company 50. The person of the apparel manufacturer 10, in charge of receiving the order, confirms the order list, prepares a receiving order confirmation, and sends the confirmation to the person of the sales company 40, in charge of issuing the order, by the electronic mail. Then, transaction data is recorded in the apparel receiving and issuing order DB 535A of the integrated DB 53.

The steps S5 to S7 will be explained in more detail with reference to FIG. 6.

If neither stock of dress nor stock of raw material is present (step S5), the apparel manufacturer 10 issues the order of the raw material to the textile company 20 when the apparel manufacturer 10 receives the order of the dress from the sales company 40. This work comprises the stock survey of the textile company 20, the vacant step survey of dying company 61, yarn company 62, weaving company 63, textile raw material company 64, which are related to the textile company 20, inquiry for raw material to the textile company 20, negotiation with the textile company 20 about the price and date of delivery, and issue of the order of raw material to the textile company 20. These processes are carried out by use of the work support service of the integrated DB 53 of the data service company 50.

Each process will explained in more detail as follows:

(1) Stock survey of the textile company (step S41)

In the apparel manufacturer 10, the person (operator) in charge of issuing the order operates the work station level terminal (working computer) 12, which is connected to the integrated database management system 52 of the data service company 50 through the public telephone line. First, the operator selects the corresponding work from the work menu displayed on the display screen of the display, and inputs the dress to be processed as an object.

The integrated database management system 52 of the data service company 50 extracts a raw material code to be used from the apparel goods DB 533B of the integrated DB 53 based on the dress code. Then, the system 52 extracts and processes data of the self-company stored in the textile receiving and issuing order DB 535C, so that data of past issuing order of the self-company is displayed as a history of issuing order in the first window. In this case, a name of the company who issues the order of the dress, the date of issuing order, the number of ordered goods, delivering date, the number of delivered goods, the examination result, etc., are displayed on the window.

Moreover, the integrated database management system 52 extracts and processes the analysis data of the self-company and other companies stored in the textile sales analysis DB 536B of the integrated DB 53, so that analysis data of the past sales results of the self-company and the analysis data of general sales state of the similar goods are displayed in the second window. In the second window, an estimation of future sales, a recommendable number of ordered goods, etc., are also displayed as required.

Also, the integrated database management system 52 extracts and processes the stock data of the textile company 20 (customer) stored in the textile stock DB 534C of the integrated DB 53, so that the stock state of the raw material to be processed as an object in the textile company 20 is displayed in the third window. In this case, the stock state to be extracted and displayed is not the actual stock state of the textile company 20 but the stock state, which is in the range (designated enterprise public data D) which the textile company 20 may publish only to the apparel manufacturer 10 (customer). Due to this, the integrated database management system 52 determines data to be extracted and displayed with reference to the customer registration, and the apparel manufacturer ID. In this case, not only the stock state of the textile company 20 but also a new manufacture schedule, the stock of raw material, the number of orders of goods, which can be received, price, delivering date, etc., can be displayed.

The operator confirms the order receiving state of the textile company 20, and and goes to the next step.

(2) vacant step survey of textile group (production company group) connected to textile company (step S42)

The number of manufacturing days of the dress largely differs, depending on whether or not dying company 61, yarn company 62, weaving company 63, textile raw material company 64, which are related to the textile company 20 can immediately start the processing of the raw material. Due to this, the operator surveys the vacant step of each company, which is related to the textile company 20, as reference data.

More specifically, if the operator selects the corresponding work from the work menu, the integrated database management system 52 opens the fourth window, and displays a schematic processing specification obtained from the textile goods DB 534B of the integrated DB 53 in the fourth window.

Moreover, the integrated database management system 52 opens one window for each of the companies 61, 62, and 63, which are related to the textile company 20, and displays the step load state obtained from the member production management DB 531D of the integrated DB 53. In this case, the step load state to be displayed in this step is not the actual step load state of each company but the step load state, which is in the range (designated enterprise public data D) which the textile company 20 may publish only to the apparel manufacturer 10. Due to this, the integrated database management system 52 displays data with reference to the customer registration, and the apparel manufacturer ID.

Moreover, the integrated database management system 52 opens the sixth window, and displays a recommendable issue order plan including the number of issuing orders, price, and delivering date based on data displayed in the above-mentioned five windows and related data, if the operator wishes to do so.

The operator considers the above data, and makes a plan of issuing order, and goes to the next step.

(3) Inquiry for raw material to textile company (step S43)

The operator selects the corresponding work from the work menu, and makes an inquiry for the raw material to the textile company 20 based on the plan of issuing order.

The integrated database management system 52 sends necessary data to the textile company 20 by use of an electronic mailing function.

The operator closes the windows used in the above-explained steps, and goes to the work of issuing the order of the raw material.

(4) Receive inquiry for raw material from apparel manufacture (step S44)

In accordance with the inquiry for the raw material from the apparel manufacturer 10, a person (operator) of the apparel manufacturer, who is charge of receiving the order, operates the work station level terminal (working computer) 22, which is connected to the integrated database management system 52 of the data service company 50 through the public telephone line to perform the work of receiving the inquiry.

More specifically, the inquiry mail for the raw material from the apparel manufacturer 10 is selected from the electronic mail sent through the data service company 50, and an inquiry receiving date, and a response schedule date are inputted. Data is returned to the terminal 12 of the apparel manufacturer 10 through the data service company 50, and the operator in charge of issuing the order, can confirm data anytime.

In the textile company 20, the work of receiving and issuing the order of the raw material comprises the steps of shipping the raw material (sales state), checking the stock, surveying the half-finished goods of the related companies, surveying the vacant step of the related companies, negotiating with the apparel manufacturer 10 about the price and the delivery date, and receiving the order of the raw material from the apparel manufacturer 10. These steps are carried out by use of the work support service of the integrated DB 53 of the data service company 50.

(5) Check the sales state and stock (step S45)

In the textile company 20, if a person (operator) in charge of receiving the order, selects the corresponding work from the work menu and inputs the code of the raw material to be processed as an object, the integrated database management system 52 extracts and processes data of receiving order of the self-company stored in the textile database receiving and issuing order DB 535C of the integrated DB 53. Then, the first window is opened, and data of past receiving order of the self-company is displayed as a history of receiving order. In this case, a name of the company who receives the order, the date of receiving order, the number of received raw material, shipping date, and the number of shipped raw material, etc., are displayed on the window.

The integrated database management system 52 extracts and processes analysis data of the self-company and other companies stored in the textile sales analysis DB 536B of the integrated DB 53 and general analysis data stored in the apparel sales analysis data DB 536A. Thereby, analysis data of the past manufacture and shipment results of the self-company, analysis data of the general sales state of the similar goods, and analysis data of general sales state analysis of the apparel are displayed in the second window. In the second window, an estimation of future shipment, a recommendable number of received orders, etc., are also displayed as required.

Moreover, the integrated database management system 52 extracts and processes the stock data of the self-company stored in the textile stock DB 534C of the integrated DB 53, so that the stock state of the self-company is displayed in the third window. In the third window, an estimation of the change of the future stock, etc., is displayed as required.

In consideration of data displayed on these three windows, the operator sets up a standard of the number of received orders, delivering date, etc., and reduces the sizes of these windows as being opened, and the operator goes to the next step.

(6) Survey vacant step of the half-finished goods of the related companies (step S46)

If the operator selects the corresponding work from the work menu, the integrated database management system 52 opens the fourth window, and extracts a schematic processing specification from the textile goods DB 534B of the integrated DB 53 and displays the schematic processing specification in the fourth window. Then, stock data of the half-finished goods (or goods in process) of the related production companies (or textile group) stored in the textile stock DB 534C are extracted and processed base on the schematic processing specification. Thereafter, the fifth window is opened, and the stock state of the half-finished goods of the related companies are displayed.

(7) Survey vacant step of related companies (step S47)

The survey of the vacant step of the related companies are performed after the stock of the raw material and the outlook for obtaining the raw material are confirmed by the above-mentioned stock check.

More specifically, if the corresponding work is selected from the work menu, the integrated database management system 52 opens the sixth window, and displays a schematic processing specification obtained from the textile goods DB 534B of the integrated DB 53 and a list of the suitable related companies 61, 62, and 63, which are obtained from the enterprise data DB 536C. Moreover, the integrated database management system 52 opens one window for each of the plurality of related companies 61 to 63, and displays a load state obtained from the member production management DB 531D of the integrated DB 53.

The operator considers the above data, and makes a plan of receiving the order, and goes to the next step.

(8) Negotiation about price and date of delivery (steps S48 and S49)

The person of the textile company 20, in charge of receiving the order, sends the plan for receiving order to the person of the apparel manufacturer 10, in charge of issuing the order, by an electronic mail through the data service company 50. Thereafter, they exchange the electronic mail with each other to negotiate about the quantity of goods, the price, and date of delivery.

The person of the textile company 20, in charge of receiving the order, can perform the process for receiving the order of the next raw material while exchanging the electronic mail.

(9) Issuing and receiving order of raw material (steps S50, S51)

If the negotiation about the quantity of dresses, the price, and the date of delivery is concluded, the person of the apparel manufacturer 10, in charge of issuing the order, prepares an order list and sends the order list to the person of the textile company 20, in charge of receiving the order, by the electronic mail through the data service company 50. The person of the textile company 20, in charge of receiving the order, confirms the order list, prepares a receiving order confirmation, and sends the confirmation to the person of the apparel manufacturer 10, in charge of issuing the order, by the electronic mail. Then, transaction data is recorded in the textile receiving and issuing order DB 535A of the integrated DB 53.

The steps S7 to S10 will be explained in more detail.

First, the following will explain the post-dying case with reference to FIG. 7.

If the textile company 20 receives the order of raw material, the operator of the textile company 20 operates the work station level terminal (working computer) 22, which is connected to the integrated database management system 52 of the data service company 50 through the public telephone line, and confirms the stock from the textile stock DB 534C (this work is performed in the similar manner as the steps S45 and 46, and the specific explanation is omitted).

As a result of the confirmation of the stock, if there is no stock of the raw material (step S61), no stock of white raw material (step S62), and no stock of yarn (step S63), in the textile company 20, the person (operator) in charge operates the terminal 22 of the self-company, and surveys the step load state of the yarn works (yarn company) 62 (step S64). Then, the integrated database management system 52 displays a schematic processing specification obtained from the textile goods DB 534B of the integrated DB 53 and a list of the suitable yarn companies 62, which are obtained from the enterprise data DB 536C. Moreover, the system 52 opens one window for each of the plurality of related companies 62, and displays a load state obtained from the member production management DB 531D of the integrated DB 53.

The operator of the textile company 20 selects a suitable yarn company 62 base on the above display.

Then, the operator operates the terminal 22, retrieves the specific processing specification, and sends a processing instruction to the terminal 622 of the selected yarn company 62 on-line through the public telephone line (step S65). In other words, the integrated database management system 52 retrieves the specific processing specification from the member DB 531C of the integrated DB 53, and sends the specific processing specification to the yarn company 62 on-line.

The yarn company 62 receives the yarn processing instruction and performs the yarn processing in accordance with the processing specification (step S66) and examines the finished goods or yarn, and ships the finished goods to the textile company 20 (step S67).

If the yarn is delivered from the yarn company 62, the textile company 20 examines the delivered yarn (step S68), and stocks an acceptable yarn in a warehouse of the self-company or that of the weaving company 63 (step S69). The textile company 20 pays the money to the yarn company 62 (step S70) and the yarn company 20 receives the money (step S71). The payment is recorded to the textile receiving and issuing order DB 535C.

Then, if there is the stock of yarn (step S63), the operator of the textile company 20 operates the terminal 22, and examines the step load state of the weaving company 63 (step S72). Then, the integrated database management system 52 displays a schematic processing specification obtained from the textile goods DB 534B of the integrated DB 53 and a list of the weaving companies 63 having a suitable weaving processing ability obtained from the enterprise data DB 536C. Furthermore, the system 52 displays a load state obtained from the member production management DB 531D of the integrated DB 53 to each of these listed weaving companies 63.

The operator of the textile company 20 selects a suitable weaving company 63 based on the above display.

Then, the operator operates the terminal 22, retrieves the specific processing specification, and sends a processing instruction to the terminal 632 of the selected weaving company 63 on-line through the public telephone line (step S73). In other words, the integrated database management system 52 retrieves the specific processing specification from the member DB 531C of the integrated DB 53, and sends the specific processing specification to the weaving company 63 on-line. The weaving company 63 receives the weaving processing instruction and performs the weaving processing in accordance with the processing specification (step S74), and examines the finished goods or white raw material, and ships the goods to the textile company 20 (step S75).

If the white raw material is delivered from the weaving company 63, the textile company 20 examines the delivered white raw material (step S76), and stocks an acceptable white raw material in a warehouse of the self-company or that of the dying company 61 (step S77). The textile company 20 pays the money to the weaving company 63 (step S78) and the weaving company 63 receives the money (step S79). The payment is recorded to the textile receiving and issuing order DB 535C.

Then, if there is the stock of white raw material (step S62), the operator of the textile company 20 operates the terminal 22, and examines the step load state of the dying company 61 (step S80). Then, the integrated database management system 52 displays a schematic processing specification obtained from the textile goods DB 534B of the integrated DB 53 and a list of the dying companies 61 having a suitable dying processing ability obtained from the enterprise data DB 536C. Furthermore, the system 52 displays a load state obtained from the member production management DB 531D of the integrated DB 53 to each of these listed dying companies 61.

The operator of the textile company 20 selects a suitable dying company 61 base on the above display.

Then, the operator operates the terminal 22, retrieves the specific processing specification, and sends a processing instruction to the terminal 612 of the selected dying company 61 on-line through the public telephone line (step S81). In other words, the integrated database management system 52 retrieves the specific processing specification from the member DB 531C of the integrated DB 53, and sends the specific processing specification to the dying company 61 on-line.

The dying company 61 receives the dying processing instruction and performs the dying processing in accordance with the processing specification (step S82) and examines the finished goods, and ships the finished goods or raw material to the textile company 20 (step S83).

If the raw material is delivered from the dying company 61, the textile company 20 examines the delivered raw material (step S84), and stocks an acceptable raw material in a warehouse of the self-company (step S85). The textile company 20 pays the money for the raw material to the dying company 61 (step S86) and the dying company 61 receives the money (step S87). The payment is recorded to the textile receiving and issuing order DB 535C.

Then, if there is the stock of raw material (step S61), the textile company 20 examines the raw material, and ships the raw material to the apparel manufacturer 10 (step S88).

If the raw material is delivered from the textile company 20, the apparel manufacturer 10 examines the delivered raw material (step S89), and stocks an acceptable raw material in a warehouse of the self-company or that of the sewing company 30 (step S90). The apparel manufacturer 10 pays the money for the raw material to the textile company 20 (step S91) and the textile company 20 receives the money (step S92). The payment is recorded to the textile receiving and issuing order DB 535C.

Figure 8:
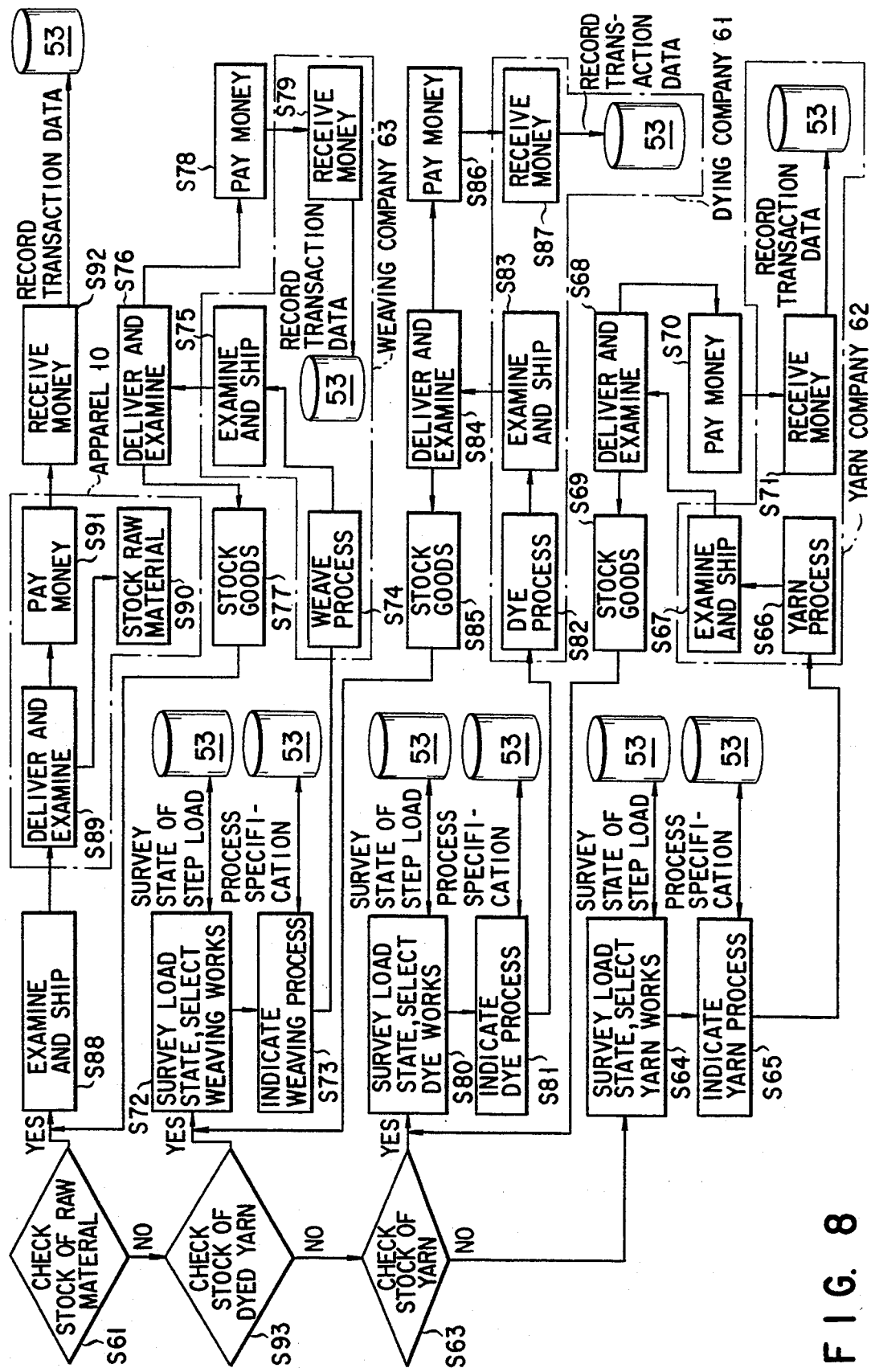
FIG. 8 is a flow chart showing steps S7 to S10 of FIG. 4 in more detail in a pre-dying case.

Next, the following will explain the pre-dying case with reference to FIG. 8.

As a result of the confirmation of the stock, if there is no stock of the raw material (step S61), no stock of died yarn (step S93), and no stock of yarn (step S63), in the textile company 20, the person (operator) in charge operates the terminal 22 of the self-company, and surveys the step load state of the yarn works (yarn company) 62 (step S64). Then, the integrated database management system 52 displays a schematic processing specification obtained from the textile goods DB 534B of the integrated DB 53 and a list of the suitable yarn companies 62, which are obtained from the enterprise data DB 536C. Moreover, the system 52 opens one window for each of the plurality of related companies 62, and displays a load state obtained from the member production management DB 531D of the integrated DB 53.

The operator of the textile company 20 selects a suitable yarn company 62 base on the above display.

Then, the operator operates the terminal 22, retrieves the specific processing specification, and sends a processing instruction to the terminal 622 of the selected yarn company 62 on-line through the public telephone line (step S65). In other words, the integrated database management system 52 retrieves the specific processing specification from the member DB 531C of the integrated DB 53, and sends the specific processing specification to the yarn company 62 on-line.

The yarn company 62 receives the yarn processing instruction and performs the yarn processing in accordance with the processing specification (step S66) and examines the finished goods or yarn, and ships the finished goods to the textile company 20 (step S67).

If the yarn is delivered from the yarn company 62, the textile company 20 examines the delivered yarn (step S68), and stocks an acceptable yarn in a warehouse of the self-company or that of the dying company 61 (step S69). The textile company 20 pays the money to the yarn company 62 (step S70) and the yarn company 62 receives the money (step S71). The payment is recorded to the textile receiving and issuing order DB 535C.

Then, if there is the stock of yarn (step S63), the operator of the textile company 20 operates the terminal 22, and examines the step load state of the dying company 61 (step S80). Then, the integrated database management system 52 displays a schematic processing specification obtained from the textile goods DB 534B of the integrated DB 53 and a list of the dying companies 61 having a suitable dying processing ability obtained from the enterprise data DB 536C. Furthermore, the system 52 displays a load state obtained from the member production management DB 531D of the integrated DB 53 to each of these listed dying companies 61.

The operator of the textile company 20 selects a suitable dying company 61 base on the above display.

Then, the operator operates the terminal 22, retrieves the specific processing specification, and sends a processing instruction to the terminal 612 of the selected dying company 61 on-line through the public telephone line (step S81). In other words, the integrated database management system 52 retrieves the specific processing specification from the member DB 531C of the integrated DB 53, and sends the specific processing specification to the dying company 61 on-line.

The dying company 61 receives the dying processing instruction and performs the dying processing in accordance with the processing specification (step S82) and examines the finished goods or died yarn, and ships the finished goods to the textile company 20 (step S83).

If the died yarn is delivered from the dying company 61, the textile company 20 examines the delivered died yarn (step S84), and stocks an acceptable died yarn in a warehouse of the self-company (step S85) or that of the weaving company 63. The textile company 20 pays the money for the died yarn to the dying company 61 (step S86) and the dying company 61 receives the money (step S87). The payment is recorded to the textile receiving and issuing order DB 535C.

If there is the stock of the died yarn (step S93), the operator of the textile company 20 operates the terminal 22, and examines the step load state of the weaving company 63 (step S72). Then, the integrated database management system 52 displays a schematic processing specification obtained from the textile goods DB 534B of the integrated DB 53 and a list of the weaving companies 63 having a suitable weaving processing ability obtained from the enterprise data DB 536C. Furthermore, the system 52 displays a load state obtained from the member production management DB 531D of the integrated DB 53 to each of these listed weaving companies 63.

The operator of the textile company 20 selects a suitable weaving company 63 base on the above display.

Then, the operator operates the terminal 22, retrieves the specific processing specification, and sends a processing instruction to the terminal 632 of the selected weaving company 63 on-line through the public telephone line (step S73). In other words, the integrated database management system 52 retrieves the specific processing specification from the member DB 531C of the integrated DB 53, and sends the specific processing specification to the weaving company 63 on-line. The weaving company 63 receives the weaving processing instruction and performs the weaving processing in accordance with the processing specification (step S74), and examines the finished goods or raw material, and ships the goods to the textile company 20 (step S75).

If the raw material is delivered from the weaving company 63, the textile company 20 examines the delivered raw material (step S76), and stocks an acceptable raw material in a warehouse of the self-company (step S77). The textile company 20 pays the money to the weaving company 63 (step S78) and the weaving company 63 receives the money (step S79). The payment is recorded to the textile receiving and issuing order DB 535C.

Then, if there is the stock of raw material (step S61), the textile company 20 examines the raw material, and ships the raw material to the apparel manufacturer 10 (step S88).

If the raw material is delivered from the textile company 20, the apparel manufacturer 10 examines the delivered raw material (step S89), and stocks an acceptable raw material in a warehouse of the self-company or that of the sewing company 30 (step S90). The apparel manufacturer 10 pays the money for the raw material to the textile company 20 (step S91) and the textile company 20 receives the money (step S92). The payment is recorded to the textile receiving and issuing order DB 535C.

Figure 9:
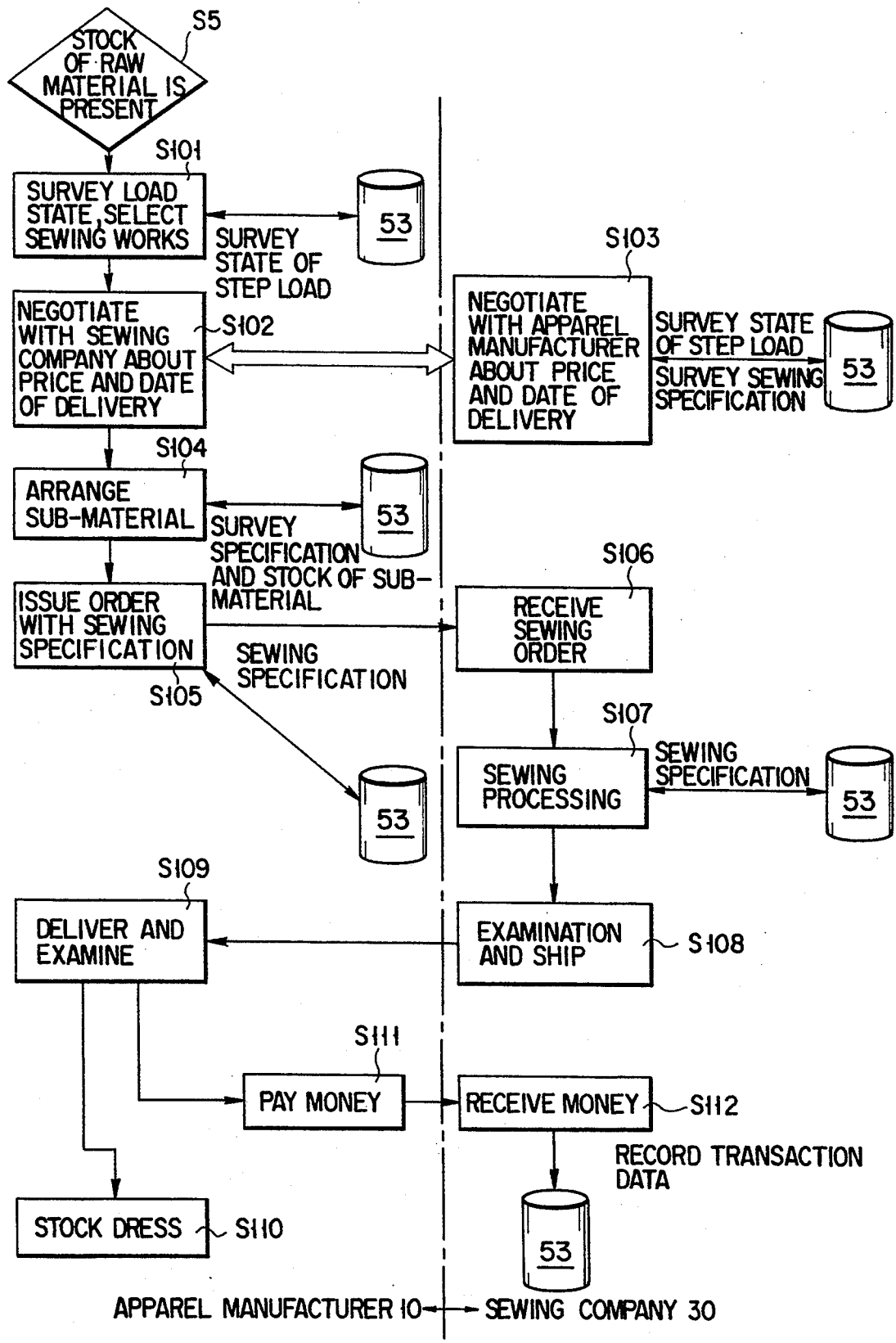
FIG. 9 is a flow chart showing steps S11 to S13 of FIG. 4 in more detail.

The steps S11 to S13 will be explained in more detail with reference to FIG. 9.

More specifically, if there is the stock of the raw material in the apparel manufacturer 10 (step S5), in the apparel manufacturer 10, a person (operator) in charge of issuing the order of sewing operates the terminal 12 of the self-company, and surveys a step load state of the sewing company 30 (step S101). More specifically, the integrated database management system 52 displays a schematic sewing specification obtained from the apparel goods DB 533B of the integrated DB 53 and a list of the sewing companies 30 having a suitable sewing processing ability obtained from the enterprise data DB 536C. Furthermore, the system 52 displays a load state obtained from the sewing production management DB 531B of the integrated DB 53 to each of these listed sewing companies 30. In this case, the step load state to be displayed in this step is not the actual step load state of each sewing company 30 but the step load state, which is in the range (designated enterprise public data β) which the sewing company 30 may publish only to the apparel manufacturer 10 (customer). Due to this, the integrated database management system 52 displays data with reference to the customer registration, and the apparel manufacturer ID.

The operator considers the above data and selects the sewing company 30 which issues the order, and goes to the next step of negotiating with the sewing company 30 about the price and the delivery date (step S102).

The sewing company 30 operates the terminal 32 of the self-company and negotiates with the apparel manufacturer 10 about the price and the delivery date by use of the electronic mail based on the schematic sewing specification obtained from the apparel goods DB 533B of the integrated DB 53 and the load state obtained from the sewing production management DB 531B of the integrated DB 53 (step S103).

If the negotiation is concluded, in the apparel manufacturer 10, the person (operator) in charge of issuing the order operates the terminal 12 of the self-company, and surveys the specific sewing specification obtained from the sewing DB 531A of the integrated DB 53 and the specification of sub-material obtained from the member DB 531C, and the stock, thereby the sub-material is arranged (step S104).

Then, the operator operates the terminal 12, and obtains the specific sewing specification from the sewing DB 531A of the integrated DB 53 by the integrated database management system 52. The apparel manufacturer 10 prepares a document of the sewing specification based on the specific sewing specification, and sends an order together with the document of the sewing specification to the sewing company 30 by an electronic mail through the data service company 50 (step S105).

In the sewing company 30, the person, in charge of receiving and issuing the order, confirms the sent order, prepares a note of confirmation, and sends the note of confirmation to the apparel manufacturer 10 by an electronic mail (step S106).

The sewing company 30 performs the sewing processing in accordance with the sewing specification (step S107). In this case, the sewing company 30 operates the terminal 32 of the self-company and obtains a specific sewing specification and CAM data from the sewing DB 531A of the integrated DB 53 by the integrated database management system 52, and the sewing processing is performed in accordance with these data.

If the dress is completed, the dress is examined, and shipped to the apparel manufacturer 10 (step S108).

The apparel manufacturer 10 examines the dress delivered from the sewing company (step S109), and stocks an acceptable dress in the warehouse of the self-company (step S110). Also, the apparel manufacturer 10 pays the money for the dress to the sewing company 30 (step S111), and the sewing company 30 receives the money (step S112). The payment is recorded to the textile receiving and issuing order DB 535C.

Figure 10:
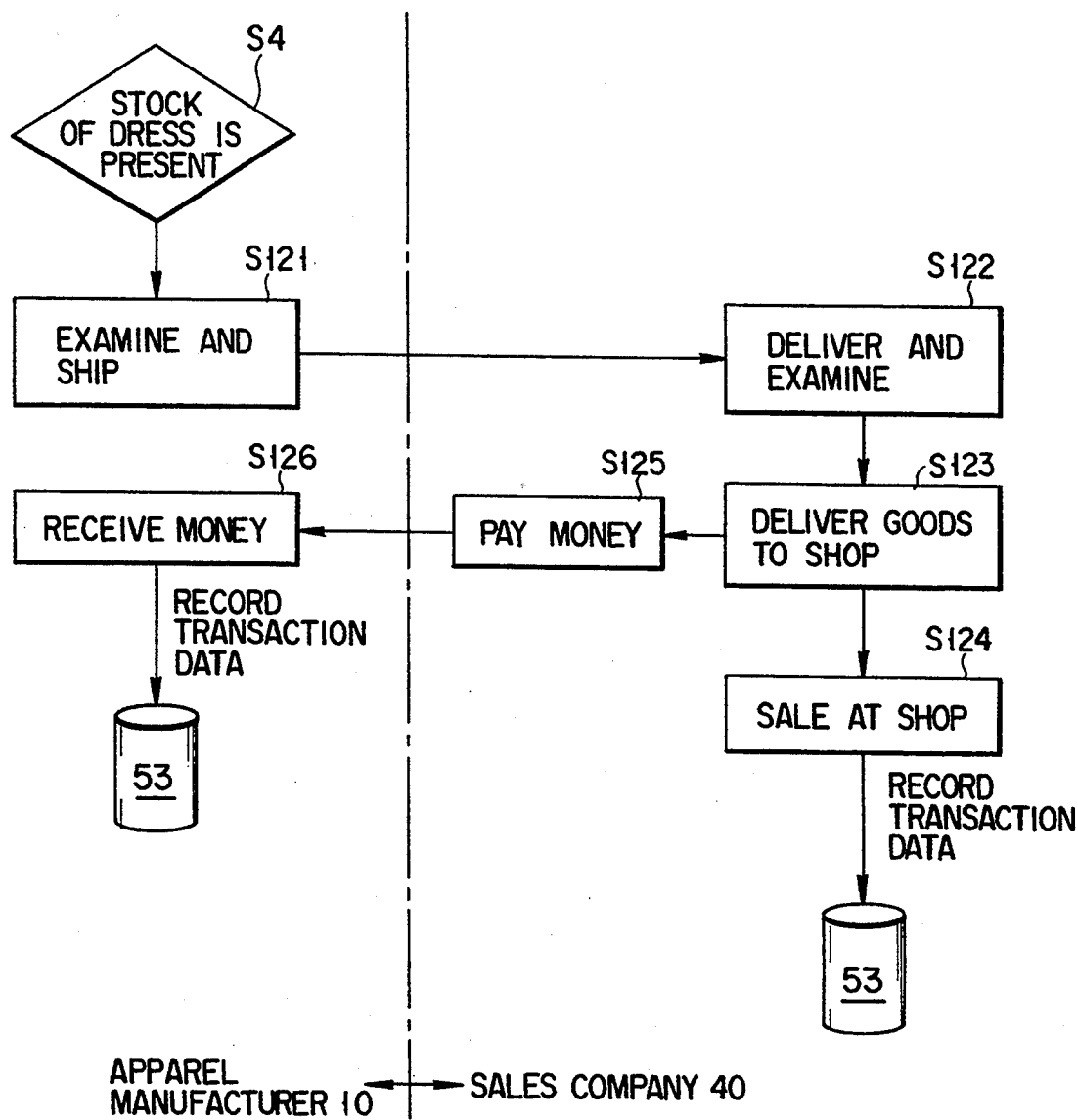
FIG. 10 is a flow chart showing steps S4 to S2 of FIG. 4 in more detail.

Next, the flow of the steps S4 to S2 will be explained with reference to FIG. 10.

More specifically, if there is a stock of the dress order by the sales company 40 in the apparel manufacturer 10 (step S4), the apparel manufacturer 10 examines the dress, and ships the dress to the sales company 40 (step S121).

The sales company 40 examines the delivered dress (step S122), and sends the dress to the shop 70, which ordered the dress to the sales company 40 (step S123). Then, the dress is sold at the shop 70 (step S124), and such data is recorded in the apparel receiving and issuing order DB 535A.

The sales company 40 pays the money for the dress to the apparel manufacturer 10 (step S125), and the apparel manufacturer 10 receives the money (step S126). The payment is recorded to the apparel receiving and issuing order DB 535A.

As mentioned above, there is formed the data service network in which the integrated database 53 in which various business data dispersively kept in each part in the apparel industry is integrated is provided as the nucleus. Thereby, the use of data can be mutually made regardless of the types of business under the restriction that the secret of the company is kept, and business efficiency can be largely improved.

Figure 11:
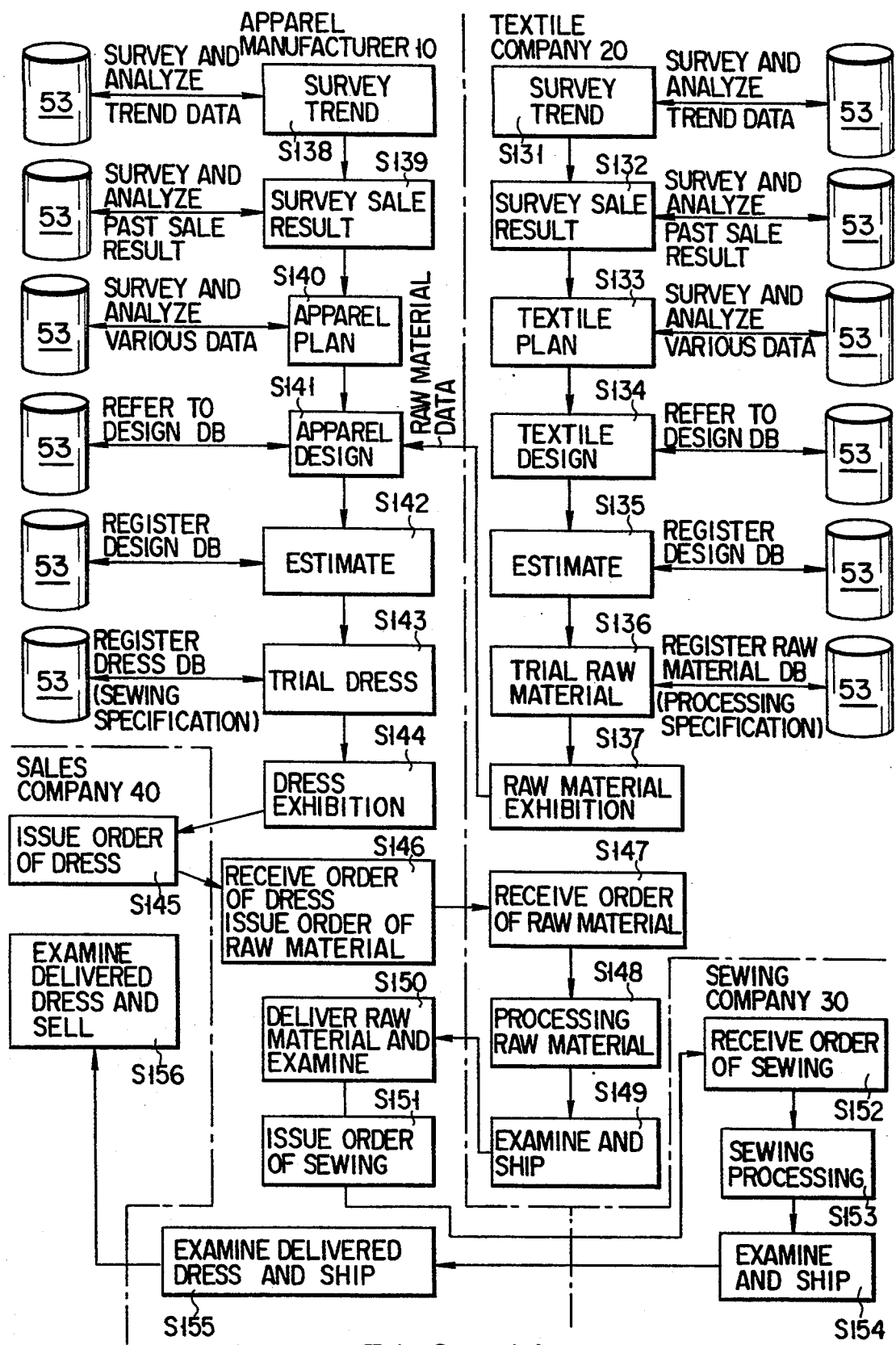
FIG. 11 is a view explaining how the plan of the dress and that of raw material are supported by the integrated data base.

The following will explain how the plan of the dress and that of the raw material, which are the very important work in view of the fashion business, are supported by the integrated DB 53 with reference to FIG. 11.

First, the plan of the raw material will be explained.

A planer of the textile company 20 surveys and analyzes trend data (step S131). In this step, the planner operates the terminal 22 of the self-company and obtains overseas and domestic fashion trend data from the apparel plan DB 532A of the integrated DB 53 and textile design trend data from the textile plan DB 532B of the integrated DB 53 by the integrated database management system 52.

The planner surveys and analyzes the past sales result (step S132).

More specifically, the planner operates the terminal 22 of the self-company, and obtains general analysis data and past trend result analysis data from the apparel sales analysis DB 536A of the integrated DB 53 and self-company and general analysis data and past trend result analysis data from the textile sales analysis DB 536B of the integrated DB 53 by the integrated database management system 52.

Based on the above-mentioned data, the planner further surveys and analyzes data of such as a business trend, a weather, a producing center, a trend of a daily life, etc., which are obtained from the general data DB 532C of the integrated DB 53, and makes a plan of the textile (step S133).

Then, if the plan is made based on various data, an actual design work is started (step S134). In other words, a designer of the textile company 20 designs the textile by use of various data fetched from the integrated DB 53 by the operation of the terminal 22 of the self-company in accordance with the plan of the textile.

As data to be used in this step, there are, for example, self-company registration design and past public textile design data, which are obtained from the textile design DB 534A of the integrated DB 53, textile design trend and textile converting data, which are obtained from the textile plan DB 532B, and overseas and domestic fashion trend data, which are obtained from the apparel plan DB 532A. Conventionally, the designer must obtain these data from the publications, a scrapbook in which necessary pages of the past publications are cut and preserved, a fashion show, a raw material exhibition, etc.

The above-prepared textile design is newly registered in the integrated DB 53, and estimated by a group of estimators comprising the planner of the textile company 20, the designer, a person in charge of sales, etc. (step S135). More specifically, the operator operates the terminal 22 of the self-company and registers the new textile design in a registration area of the self-company of the textile design DB 534A of the integrated DB 53 by the integrated database management system 52. Also, the estimator operates the terminal 22 of the self-company, and determines the estimation of the new textile design based on textile design trend data obtained from the textile plan DB 532B of the integrated DB 53 and overseas and domestic fashion trend data obtained from the apparel plan DB 532A of the integrated DB 53 by the integrated database management system 52.

As a result of the estimation, regarding the design, which has strong possibility of its selling, the raw material is manufactured by way of trial (step S136). In this case, the operator operates the terminal 22 of the self-company, and registers the raw material, serving as a new goods, in the textile goods DB 534B of the integrated DB 53 by the integrated database management system 52. The operator also registers the specific processing specification such as yarn, weaving, dying, textile converting, etc., in the member DB 531C.

The above-manufactured raw material is published at, for example, the raw material exhibition (step S137).

On the other hand, the plan of the dress of the apparel manufacturer will be explained.

A planner of the apparel manufacturer 10 surveys and analyzes trend data (step S138). In this step, the planner operates the terminal 12 of the self-company obtains overseas and domestic fashion trend data from the apparel plan DB 532A of the integrated DB 53 by the integrated database management system 52.

Next, the planner surveys and analyzes the past sales result (step S139). More specifically, the planner operates the terminal 12 of the self-company, and obtains self-company or general (other companies) analysis data and past trend, and sales result analysis data from the apparel sales analysis DB 536A of the integrated DB 53 by the integrated database management system 52.

Based on the above-mentioned data, the planner further surveys and analyzes data of such as a business trend, a weather, a producing center, a trend of a daily life, etc., which are obtained from the general data DB 532C of the integrated DB 53, and textile design trend data, which is obtained from the textile plan DB 532B, and makes a plan of the textile (step S140).

Then, if the plan is made based on various data, an actual design work is started (step S141). In other words, a designer of the apparel manufacturer 10 designs the dress by use of various data fetched from the integrated DB 53 by the operation of the terminal 12 of the self-company in accordance with the plan of the dress. As data to be used in this step, there are, for example, self-company registration design and past public design data, which are obtained from the apparel design DB 533A of the integrated DB 53, and overseas and domestic fashion trend data, which are obtained from the apparel plan DB 532A, and textile goods data, which is obtained from the textile plan DB 532B. Conventionally, the designer must obtain these data from the publications, a scrapbook in which necessary pages of the past publications are cut and preserved, a fashion show, etc.

The above-designed dress is newly registered in the integrated DB 53, and estimated by a group of estimators comprising the planner of the apparel manufacturer 10, the designer, a person in charge of sales, etc. (step S142). More specifically, the operator operates the terminal 12 of the self-company and registers the new designed dress in a registration area of the self-company of the apparel design DB 533A of the integrated DB 53 by the integrated database management system 52. Also, the estimator operates the terminal 12 of the self-company, and determines the estimation of the new design of the dress based on overseas and domestic fashion trend data, which is obtained from the apparel plan DB 532A of the integrated DB 53 by the integrated database management system 52.

As a result of the estimation, regarding the design, which has strong possibility of its selling, the dress is manufactured by way of trial (step S143). In this case, the operator operates the terminal 12 of the self-company, and registers the dress, serving as a new goods, in the apparel goods DB 533B of the integrated DB 53 by the integrated database management system 52. Also, the operator newly registers the sewing processing specification such as patterning, grating, marketing, etc., in the sewing DB 531C.

The above-manufactured dress is published at, for example, the dress exhibition, the fashion show, etc. (step S144).

Then, the sales company 40 issues the order of the dress, which has strong possibility of its selling well among the published dresses, the apparel manufacturer (step S145). Since the following steps are the same as those of the first embodiment, only the outline of the steps will be explained.

More specifically, if the apparel manufacturer 10 receives the order of the dress from the sales company 40, the apparel manufacturer 10 issues the order of the raw material necessary for manufacturing the dress to the textile company 20 (step S146).

The textile company 20 receives the order of the raw material (step S147), and obtains the processing specification from the integrated DB 53. The raw material is processed by the subsidiary companies of the textile company 20, that is, the dying company 61, yarn company 62, and the weaving company 63 (step S148). Then, the completed raw material is examined, and shipped to the apparel manufacturer 10 (step S149).

The apparel manufacturer 10 examines the raw material delivered from the textile company 20 (step S150), and issues the order of sewing, and sends the raw material (step S151).

The sewing company 30 receives the order of sewing (step S152) and obtains the sewing specification from the integrated DB 53, and sews the dress by use of the raw material sent from the apparel manufacturer 10 (step S153). If the sewing of the dress is finished, the finished goods are examined, and shipped to the apparel manufacturer 10 (step S154).

The apparel manufacturer 10 examines the delivered dress, and the dress is shipped to the sales company 40 (step S155).

The sales company 40 examines the delivered dress, and the dress is sold at the shop 70 (step S156).

Accordingly, data of the integrated database is sequentially renewed and increased. By use of such an integrated database, the plan of the textile and that of the dress, and the production work can be efficiently performed.

The first and second embodiments explained the case of the apparel industry. However, the present invention is not limited to the above embodiments. The present invention can be applied to, for example, the bag and shoes industries in which the production is carried out in many types of goods of goods and a small quantity similar to the dress industry.

Figure 12:
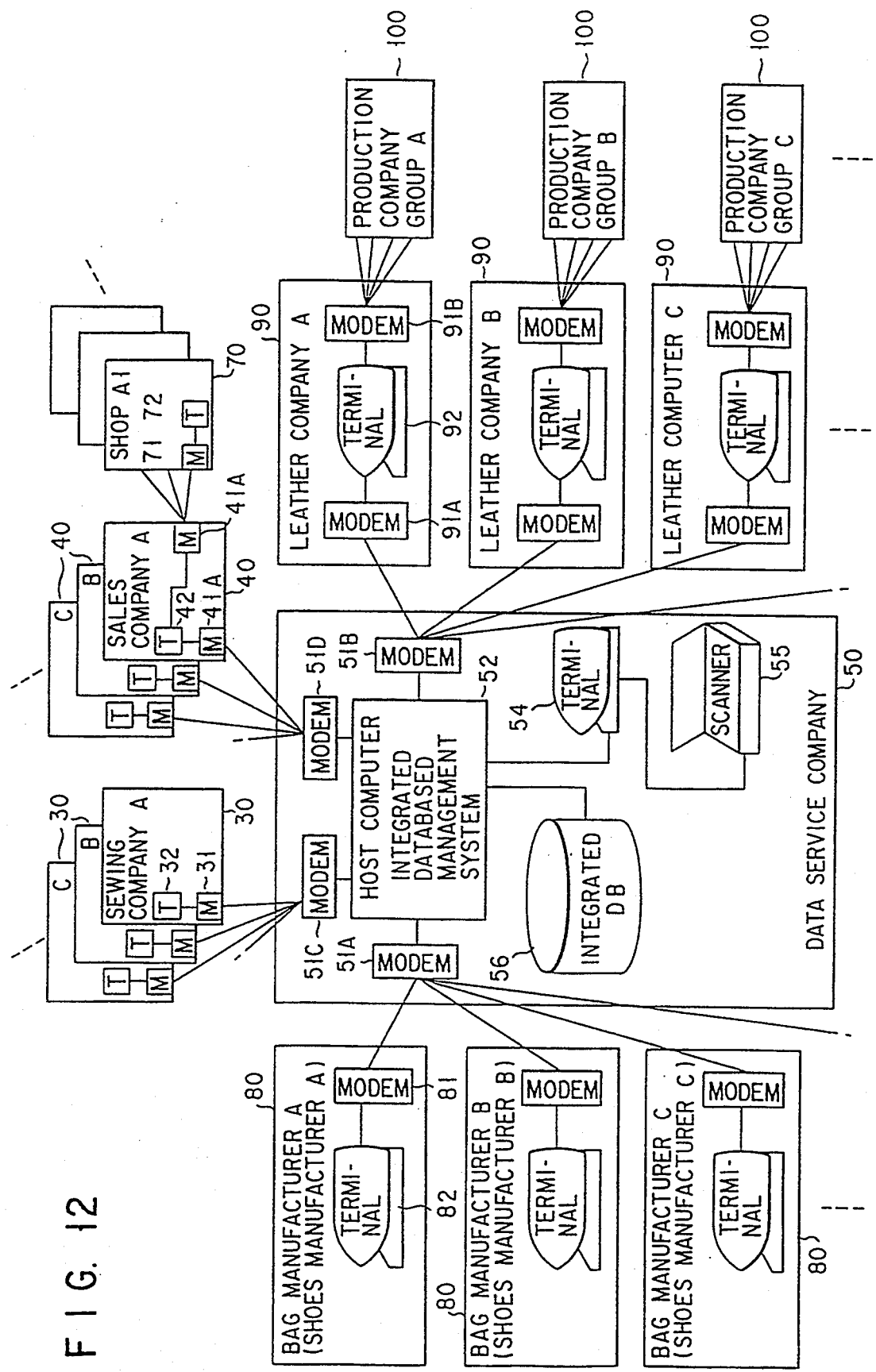
FIG. 12 is a view showing the structure of the present invention in a case that the present invention is applied to a bag (or shoes) industry.

In the case that the present invention is applied to such industries, as shown in FIG. 12, the bag or shoes manufacturer 80 is put at the position of the apparel manufacturer 10, and a leather company 90 is put at the position of the textile company 20. Production company groups 100 include companies for the manufacture of leather, such as a tanning company and a dying company.

Also, an integrated DB 56 of the data service company 50 comprises various types of data in the bag or shoes industry corresponding to the integrated DB 53, that is, as shown in FIG. 13, a production data DB 561, a plan data DB 562, a bag (shoes) DB 563, a leather DB 564, a transaction DB 565, a management support DB 566, and a work DB 567.

According to the present invention, various types of data relating to the manufacture of the material to the sales of the finished goods, which the companies individually possess, is integrated into one database system as considering the systematic use of data. Moreover, a data work system, which can be mutually used among the companies, is formed on condition that the business secret is kept, thereby realizing high-grade data service.

Therefore, it is obvious that time-lag and the number of the stocked goods and the number of returned goods can be reduced and that the additional manufacture can be performed at the time when goods are selling well as checking the sales trend.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A data processing network for which a plurality of product selling enterprises, a plurality of product planning and selling enterprises, a plurality of product processing and manufacturing enterprises and a plurality of material selling enterprises subscribe, comprising:

a database for gathering and accumulating data retained separately by said plurality of product selling enterprises for independently selling products, by said plurality of product planning and selling enterprises for independently planning and selling said products, by said plurality of product processing and manufacturing enterprises for independently processing and manufacturing said products and by said plurality of material selling enterprises for independently planning, manufacturing and selling materials of said products;

a plurality of first terminals, provided in each of said plurality of product selling enterprises, for:
inputting business history data on products to be actually sold,
inputting one of retrieval instructions as to the business history data, data on manufacturing and selling said products and data on products in stock,
sending the input data and retrieval instructions,
receiving retrieved business history data, data on manufacturing and selling said products and data on products in stock, and
outputting the received data;

a plurality of second terminals, provided in each of the plurality of product planning and selling enterprises, for:
inputting said business history data on products to be actually sold, said data on manufacturing and selling said products and said data on products in stock,
inputting one of retrieval instructions as to data for use in planning the products, data for use in planning the materials, data on manufacturing and selling the products to be actually sold, the data on products in stock, data on the materials in stock, business history data on the products and business history data on the materials,
sending the input data and the retrieval instructions,
receiving retrieved data for use in planning the products, data for use in planning the materials, data on manufacturing and selling products to be actually sold, data on products in stock, data on materials in stock, business history data on the products and business history data on the materials and
outputting the received data;

a plurality of third terminals, provided in each of said plurality of product processing and manufacturing enterprises, for:
inputting retrieval instructions as to the data on manufacturing and selling the products to be actually sold,
sending the input retrieval instructions,
receiving retrieved data on manufacturing and selling the products to be actually sold and
outputting the received data;

a plurality of fourth terminals, provided in each of said plurality of material selling enterprises, for:
inputting data on manufacturing materials to be used as goods, the data on materials in stock, the business history data on the materials,
inputting one of retrieval instructions as to the data for use in planning the products, the data for use in planning the materials, the data on manufacturing materials to be used as goods, the data on materials in stock and the business history data on the materials,
sending the input data and the retrieval instructions,
receiving retrieved data for use in planning the products, data for use in planning the materials, data on manufacturing materials to be used as goods, data on materials in stock and business history data on the materials, and
outputting the received data; and control means, connected to said database and connected to said plurality of first to fourth terminals through a communication line, for:
storing data sent from said first to fourth terminals, and
retrieving data instructed by said database in accordance with the retrieval instructions sent from one of said first to fourth terminals; and said database including:
a plan data database for storing at least the data for use in planning the products and the data for use in planning the materials;
a product database for storing at least data on producing and selling the products to be actually sold and data on products in stock;
a material database for storing at least the data on manufacturing the materials to be used as goods, and the data on materials in stock; and
a business history database for storing at least the business history data on the products and the business history data on the materials.

2. The apparatus according to claim 1, further comprising a fifth terminal, connected to said control means, for inputting the data for use in planning the products and the data for use in planning the materials.

3. The apparatus according to claim 1, wherein said control means includes means for sending the retrieved data to predetermined terminals and for processing the retrieved data to send the processed data to remaining terminals.

4. The apparatus according to claim 1, wherein said products are dresses and said materials are textile raw materials.

5. The apparatus according to claim 4, wherein said plan data database includes:
an apparel plan database for storing data for use in planning and manufacturing the dresses; and
a textile plan database for storing related data for use in planning and manufacturing the textile.

6. The apparatus according to claim 4, wherein said product database includes:
an apparel design database for storing design data as to what types of dresses are made;
an apparel goods database for storing data on manufacturing and selling dresses to be actually sold; and
an apparel stock database for storing data on goods in stock.

7. The apparatus according to claim 6, wherein the data stored in said apparel goods database includes data as to what types of dresses are made, what types of textile raw materials are prepared and what sewing process is carried out.

8. The apparatus according to claim 4, wherein said material database includes:
a textile design database for storing design data as to what patterns of textile are made;
a textile goods database for storing data for use in manufacturing the textile to be used as goods; and
a textile stock database for storing data on the textile in stock.

9. The apparatus according to claim 4, wherein said business history database includes:
an apparel receiving and issuing order database for storing business history data on the apparel; and
a textile receiving and issuing order database for storing business history data on the textile.

10. The apparatus according to claim 1, wherein said products are bags and shoes, and said materials are leather.

11. The apparatus according to claim 10, wherein said plan data database includes:
a bag and shoes plan database for storing data for use in planning and manufacturing the bags and the shoes; and
a leather plan database for storing related data for use in planning and manufacturing the leather.

12. The apparatus according to claim 10, wherein said product database includes:
a bag and shoes design database for storing design data as to what types of bags and shoes are manufactured;
a bag and shoes goods database for storing data on producing and selling bags and shoes to be actually sold; and
a bag and shoes stock database for storing data on goods in stock.

13. The apparatus according to claim 12, wherein data stored in said bag and shoes goods database includes data as to what types of bags and shoes are manufactured, what types of leather are prepared and what sewing process is carried out.

14. The apparatus according to claim 10, wherein said material database includes:
a leather design database for storing design data as to what patterns and colors of leather are manufactured;
a leather goods database for storing data for use in manufacturing the leather to be used as goods; and
a leather stock database for storing data on the leather in stock.

15. The apparatus according to claim 10, wherein said business history database includes: a bag and shoes receiving and issuing order database for storing business history data on the bags and the shoes; and a leather receiving and issuing order database for storing business history data on the leather.

* * * * *